(12) United States Patent
Tseng et al.

(10) Patent No.: US 12,113,382 B2
(45) Date of Patent: Oct. 8, 2024

(54) CHARGING CONTROL APPARATUS AND CHARGING CONTROL METHOD FOR USE IN MOBILE DEVICES AND CHARGING SYSTEM

(71) Applicant: Richtek Technology Corporation, Zhubei (TW)

(72) Inventors: Shih-Hsin Tseng, Changhua (TW); Tseng-Chuan Wu, Hsinchu (TW); Po-Ching Lee, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 521 days.

(21) Appl. No.: 17/520,633

(22) Filed: Nov. 6, 2021

(65) Prior Publication Data

US 2022/0166230 A1 May 26, 2022

(30) Foreign Application Priority Data

Nov. 24, 2020 (TW) .................................. 109141165

(51) Int. Cl.
*H02J 7/00* (2006.01)
(52) U.S. Cl.
CPC ........ *H02J 7/0019* (2013.01); *H02J 7/00041* (2020.01); *H02J 7/0024* (2013.01); *H02J 7/007182* (2020.01); *H02J 2207/20* (2020.01)
(58) Field of Classification Search
CPC .................................................... H02J 7/0019

USPC .......................................................... 320/149
See application file for complete search history.

(56) References Cited

U.S. PATENT DOCUMENTS

| | | | | |
|---|---|---|---|---|
| 7,471,059 B2* | 12/2008 | Bayne | .................... | H02J 7/0019 320/155 |
| 7,834,591 B2* | 11/2010 | Hussain | ................ | H01M 10/44 320/128 |
| 2007/0279010 A1* | 12/2007 | Okamura | ................ | H02J 7/345 320/166 |
| 2015/0100260 A1* | 4/2015 | Joe | ...................... | H01M 50/569 702/63 |
| 2020/0127468 A1* | 4/2020 | Hackl | ..................... | H02J 9/061 |

* cited by examiner

*Primary Examiner* — Jerry D Robbins
(74) *Attorney, Agent, or Firm* — Tung & Associates

(57) ABSTRACT

A charging control apparatus provides a supply power to first and second mobile devices. Each of the first and the second mobile device includes a mobile charging circuit and a battery. The charging control apparatus includes a switching power converter for converting an input power to the supply power, and a conversion control circuit for controlling the switching power converter according to the following steps: S1: controlling the switching power converter, so as to establish a current versus voltage characteristic curve corresponding to the supply power; and S2: determining a charging mode combinations of the first and the second mobile device and/or adjusting a supply voltage of the supply power to charge the battery of each mobile device according to the current versus voltage characteristic curve, so as to reduce a voltage drop of each mobile device as well as the power loss.

36 Claims, 21 Drawing Sheets

| Mode Combination Code | Charging Mode Combinations for the Mobile Devices | First Mode Inflection Point | | Second Mode Inflection Point | |
|---|---|---|---|---|---|
| | | VS[1] | IS[1] | VS[2] | IS[2] |
| 0 | NC, NC | None | None | None | None |
| 1 | NC, PC | <Vthcc | I_PC | None | None |
| 2 | NC, CV | >Vthcv | I_PC ~ I_CC | None | None |
| 3 | NC, CC | Vthcc ~ Vthcv | I_CC | None | None |
| 4 | PC, PC | <Vthcc | I_PC | <Vthcc | 2*I_PC |
| 5 | PC, CV | <Vthcc | I_PC | >Vthcv | 2*I_PC ~ I_CC+I_PC |
| 6 | CV, CV | >Vthcv | I_PC ~ I_CC | >Vthcv | 2*I_PC ~ 2*I_CC |
| 7 | PC, CC | <Vthcc | I_PC | Vthcc ~ Vthcv | I_PC+I_CC |
| 8 | CC, CV | Vthcc ~ Vthcv | I_CC | >Vthcv | I_PC+I_CC ~ 2*I_CC |
| 9 | CC, CC | Vthcc ~ Vthcv | I_CC | Vthcc ~ Vthcv | 2*I_CC |

Comparing current level of IS at or subsequent to the mode inflection point with I_PC and I_CC, to determine which charging mode combination where the mobile devices are in.

Fig. 14A

S21 comparing current level of IS at or subsequent to the mode inflection point with I_PC and I_CC and comparing voltage level of VS at the mode inflection point with Vthcc and Vthcv, to determine which charging mode combination the mobile devices are in.

At least one of step S210 to step S219

Fig. 14C

CHARGING CONTROL APPARATUS AND CHARGING CONTROL METHOD FOR USE IN MOBILE DEVICES AND CHARGING SYSTEM

CROSS REFERENCE

The present invention claims priority to TW 109141165 filed on Nov. 24, 2020.

BACKGROUND OF THE INVENTION

Field of Invention

The present invention relates to a charging control apparatus; particularly, it relates to such charging control apparatus for use in mobile devices. The present invention also relates to a charging control method for use in the mobile devices. Besides, the present invention relates to a charging system including such charging control apparatus and such mobile devices.

Description of Related Art

Please refer to FIG. 1, which shows a schematic block diagram of a conventional charging control apparatus (i.e., charging control apparatus 101) for use in a mobile device. The conventional charging control apparatus 101 can be for example a charging box. The mobile devices 30[1] and 30[2] can be for example a true wireless stereo (TWS) headphone. The conventional charging control apparatus 101 includes: a battery 11, a state of charge meter circuit 12, a microcontroller 13, a buck-boost power converter 14'. Each of the mobile devices 30[1] and 30[2] includes: a mobile charging circuit 31 and a battery 32. The buck-boost power converter 14' is configured to operably convert a battery power supplied from the battery 11 to a supply voltage VS. Each mobile charging circuit 31 of the corresponding TWS headphone (i.e., mobile devices 30[1] and 30[2]) can subsequently convert the supply voltage VS to a corresponding charging power VC, to charge the corresponding battery 32. Because the batteries 32 of the TWS headphones (i.e., mobile devices 30[1] and 30[2]) may have different charge quantities, the conventional charging box (i.e., charging control apparatus 101) employs a power line communication (PLC) module 15 to communicate with the PLC module 33 of each TWS headphone (i.e., mobile devices 30[1] and 30[2]) by means of power line communication (PLC), so as to obtain information concerning battery capacity, voltage or current of the TWS headphones (i.e., mobile devices 30[1] and 30[2]), and adjusts the supply voltage VS generate from the buck-boost power converter 14' accordingly, so as to reduce a voltage drop of the mobile charging circuit 31 of each corresponding TWS headphone (i.e., mobile devices 30[1] and 30[2]), thus enhancing power conversion efficiency and reducing heat generation, thereby improving durability of the h battery 32 in the conventional charging box (i.e., charging control apparatus 101).

The prior art charging box (i.e., charging control apparatus 101) shown in FIG. 1 has the following drawbacks that: because it is required for both the charging box (i.e., charging control apparatus 101) and the TWS headphones (i.e., mobile devices 30[1] and 30[2]) to employ a PLC module (e.g., PLC module 15 and PLC modules 33), the prior art charging control apparatus 101 requires a larger space, has a higher cost and consumes more power.

As compared to the prior art in FIG. 1, the present invention is advantageous in that: it is not required for the charging control apparatus of the present invention to adopt a PLC module, which can result in saving space and size reduction of the charging control apparatus and the mobile devices; the cost and power consumption are also reduced.

SUMMARY OF THE INVENTION

From one perspective, the present invention provides a charging control apparatus, which is configured to operably provide a supply power to at least a first mobile device and a second mobile device, wherein each of the first and the second mobile device includes: a mobile charging circuit and a first battery, wherein each mobile charging circuit is configured to operably convert the supply power to a charging power for charging the corresponding first battery, wherein the mobile charging circuit is operable in at least two of the following charging modes: a precharging (PC) mode, a constant current (CC) charging mode and a constant voltage (CV) charging mode, so as to charge the corresponding first battery; the charging control apparatus comprising: a switching power converter, which is configured to operably convert an input power to the supply power, wherein the supply power has a supply voltage and a supply current; and a conversion control circuit, which is configured to operably control the switching power converter; wherein the conversion control circuit is configured to operably control the switching power converter according to the following steps: step S1: controlling the switching power converter to gradually adjust a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present: step S21: determining a charging mode combination where the first mobile device and the second mobile device are in; or step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

In one embodiment, the step S21 includes: in the situation where the at least one mode inflection point is present, comparing the information indicated by the supply current corresponding to the at least one mode inflection point with a preset precharging (PC) current level and a preset constant current (CC) current level, so as to determine the charging mode combination where the first mobile device and the second mobile device are in.

In one embodiment, the step S21 includes: comparing the information indicated by the supply voltage corresponding to the at least one mode inflection point of the current versus voltage characteristic curve with a constant voltage (CV) voltage threshold and a CC voltage threshold, so as to determine the charging mode combination where the first mobile device and the second mobile device are in.

In one embodiment, in the step S21, the conversion control circuit is configured to operably determine which charging mode combination the first mobile device and the second mobile device are in according to the current versus voltage characteristic curve by at least one of following steps:

step S210: in a case wherein the current versus voltage characteristic curve has no mode inflection point, or, in a case wherein within the preset voltage range, the corresponding levels of the supply current are all lower than the preset PC current level, determining that the first mobile device and the second mobile device are in a charging mode combination (0), wherein in the charging mode combination (0), the first mobile device and the second mobile device are both in a charging termination mode;

step S211: in a case wherein the current versus voltage characteristic curve has one and only one mode inflection point and in a case wherein after the supply voltage has exceeded the mode inflection point, the corresponding level of the supply current is equal to the preset PC current level, determining that the first mobile device and the second mobile device are in a charging mode combination (1), wherein in the charging mode combination (1), one of the first mobile device and the second mobile device is in the PC mode, whereas, another one of the first mobile device and the second mobile device is in the charging termination mode;

step S212: in a case wherein the current versus voltage characteristic curve has one and only one mode inflection point and in a case wherein after the supply voltage has exceeded the mode inflection point, the corresponding level of the supply current is greater than the preset PC current level and smaller than the preset CC current level, determining that the first mobile device and the second mobile device are in a charging mode combination (2), wherein in the charging mode combination (2), one of the first mobile device and the second mobile device is in the CV charging mode, whereas, another one of the first mobile device and the second mobile device is in the charging termination mode;

step S213: in a case wherein the current versus voltage characteristic curve has one and only one mode inflection point and in a case wherein after the supply voltage has exceeded the mode inflection point, the corresponding level of the supply current is equal to the preset CC current level, determining that the first mobile device and the second mobile device are in a charging mode combination (3), wherein in the charging mode combination (3), one of the first mobile device and the second mobile device is in the CC charging mode, whereas, another one of the first mobile device and the second mobile device is in the charging termination mode;

step S214: in a case wherein the current versus voltage characteristic curve has at least one mode inflection point and in a case wherein the corresponding level of the supply current which corresponds to a greatest one of the supply voltages corresponding to the at least one mode inflection point is equal to two-fold of the preset PC current level, determining that the first mobile device and the second mobile device are in a charging mode combination (4), wherein in the charging mode combination (4), the first mobile device and the second mobile device are both in the PC mode;

step S215: in a case wherein the current versus voltage characteristic curve has a plurality of inflection points and in a case wherein the corresponding level of the supply current which corresponds to the greatest one of the supply voltages corresponding to the at least one mode inflection point is greater than two-fold of the preset PC current level and smaller than a sum of the preset CC current level plus the preset PC current level, determining that the first mobile device and the second mobile device are in a charging mode combination (5), wherein in the charging mode combination (5), one of the first mobile device and the second mobile device is in the CV charging mode, whereas, another one of the first mobile device and the second mobile device is in the PC mode;

step S216: in a case wherein the current versus voltage characteristic curve has the at least one mode inflection point and in a case wherein the corresponding level of the supply current which corresponds to the greatest one of the supply voltages corresponding to the at least one mode inflection point is greater than two-fold of the preset PC current level and smaller than two-fold of the preset CC current level, determining that the first mobile device and the second mobile device are in a charging mode combination (6), wherein in the charging mode combination (6), the first mobile device and the second mobile device are both in the CV charging mode;

step S217: in a case wherein the current versus voltage characteristic curve has the at least one mode inflection point and in a case wherein the corresponding level of the supply current which corresponds to the greatest one of the supply voltages corresponding to the at least one mode inflection point is equal to the sum of the preset CC current level plus the preset PC current level, determining that the first mobile device and the second mobile device are in a charging mode combination (7), wherein in the charging mode combination (7), one of the first mobile device and the second mobile device is in the CC charging mode, whereas, another one of the first mobile device and the second mobile device is in the PC mode;

step S218: in a case wherein the current versus voltage characteristic curve has the at least one mode inflection point and in a case wherein the corresponding level of the supply current which corresponds to the greatest one of the supply voltages corresponding to the at least one mode inflection point is greater than the sum of the preset CC current level plus the preset PC current level and smaller than two-fold of the preset CC current level, determining that the first mobile device and the second mobile device are in a charging mode combination (8), wherein in the charging mode combination (8), one of the first mobile device and the second mobile device is in the CC charging mode, whereas, another one of the first mobile device and the second mobile device is in the CV charging mode; and/or step S219: in a case wherein the current versus voltage characteristic curve has the at least one mode inflection point and in a case wherein the corresponding level of the supply current which corresponds to the greatest one of the supply voltages corresponding to the at least one mode inflection point is equal to two-fold of the preset CC current level, determining that the first mobile device and the second mobile device are in a charging mode combination (9), wherein in the charging mode combination (9), the first mobile device and the second mobile device are both in the CC charging mode.

In one embodiment, in a case wherein the charging control apparatus is configured to operably determine the charging mode combination where the first mobile device and the second mobile device are in according to at least one of the step S212, the step S215, the step S216 or the step S218, each of the step S212, the step S215, the step S216 and the step S218 further includes a corresponding operation as the following:

the step S212 further including: only when the information indicated by the supply voltage corresponding to the at least one mode inflection point is greater than or equal to the CV voltage threshold, then determining that the first mobile device and the second mobile device are in the charging mode combination (2);

the step S215 further including: only when the information indicated by the greatest one of the supply voltages corresponding to the mode inflection points is greater than or equal to the CV voltage threshold and when the information indicated by the smallest one of the supply voltages corresponding to the mode inflection points is smaller than the CC voltage threshold, then determining that the first mobile device and the second mobile device are in the charging mode combination (5);

the step S216 further including: only when the information indicated by the supply voltages corresponding to the at least one mode inflection point are all greater than or equal to the CV voltage threshold, then determining that the first mobile device and the second mobile device are in the charging mode combination (6); and/or the step S218 further including: only when the information indicated by the greatest one of the supply voltages corresponding to the at least one mode inflection point is greater than the CV voltage threshold and when the information indicated by the smallest one of the supply voltages corresponding to the at least one mode inflection point is smaller than the CV voltage threshold and is greater than or equal to the CC voltage threshold, then determining that the first mobile device and the second mobile device are in the charging mode combination (8).

In one embodiment, in a case wherein the step S21 is present, the conversion control circuit is configured to operably control the switching power converter further according to the following step: step S3: according to the charging mode combination where the first mobile device and the second mobile device are in and according to the information indicated by the supply current and/or the supply voltage corresponding to the at least one mode inflection point, adjusting the supply voltage to charge the first battery of the corresponding mobile device, so as to reduce the voltage drop of each mobile charging circuit.

In one embodiment, the step S3 includes the following step: step S31: in a case wherein the first mobile device and the second mobile device are in the charging mode combination (1), the charging mode combination (2) or the charging mode combination (3), according to the supply voltage corresponding to the one and the only one mode inflection point, determining the level of the supply voltage to charge the first battery of the corresponding mobile device, so as to enhance charging speed and reduce the voltage drop of each mobile charging circuit.

In one embodiment, wherein the step S3 includes one of the following steps: step S32: in a case wherein the first mobile device and the second mobile device are in the charging mode combination (4) to (9), in a power-saving power supply mode, according to the smallest one of the supply voltages corresponding to the at least one mode inflection point, determining the level of the supply voltage to charge the first battery of the corresponding mobile device, thus reducing the voltage drop of each mobile charging circuit; step S33: in a case wherein the first mobile device and the second mobile device are in the charging mode combination (4) to (9), in a fast-charging power supply mode, according to the greatest one of the supply voltages corresponding to the at least one mode inflection point, determining the level of the supply voltage, so as to charge the first battery of the corresponding mobile device, thus enhancing charging speed and reducing the voltage drop of each mobile charging circuit; or step S34: in a case wherein the first mobile device and the second mobile device are in the charging mode combination (4) to (9), in a balance power supply mode, adjusting the level of the supply voltage, so that the adjusted level of the supply voltage lies between the greatest one of the supply voltages corresponding to the at least one mode inflection point and the smallest one of the supply voltages corresponding to the at least one mode inflection point, thus charging the first battery of the corresponding mobile device, thereby balancing charging speed and power loss.

In one embodiment, the step S22 includes one of the following steps: step S221: in a power-saving power supply mode, determining the level of the supply voltage according to the smallest one of the supply voltages corresponding to the at least one mode inflection point, so as to charge the first battery of the corresponding mobile device, thus reducing the voltage drop of each mobile charging circuit; step S222: in a fast-charging power supply mode, determining the level of the supply voltage according to the greatest one of the supply voltages corresponding to the at least one mode inflection point, so as to charge the first battery of the corresponding mobile device, thus enhancing charging speed and reducing the voltage drop of each mobile charging circuit; or step S223: in a balance power supply mode, adjusting the level of the supply voltage, so that the adjusted level of the supply voltage lies between the greatest one of the supply voltages corresponding to the at least one mode inflection point and the smallest one of the supply voltages corresponding to the at least one mode inflection point, thus charging the first battery of the corresponding mobile device, thereby balancing charging speed and power loss.

In one embodiment, subsequent to the step S22, the conversion control circuit is configured to operably control the switching power converter further according to the following step: step S4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

In one embodiment, subsequent to the step S22, the conversion control circuit is configured to operably control the switching power converter further according to the following step: step S5: after a preset charging period has passed, proceeding back to the step S1.

In one embodiment, subsequent to the step S3, the conversion control circuit is configured to operably control the switching power converter further according to the following step: step S4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

In one embodiment, subsequent to the step S3, the conversion control circuit is configured to operably control the switching power converter further according to the following step: step S5: after a preset charging period has passed, proceeding back to the step S1, and repeating the steps S1-S3 and S5 until the charging to the first batteries is terminated.

In one embodiment, the charging control apparatus further comprises: a state of charge meter coupled to the conversion control circuit and a second battery configured to operably provide an input power, wherein the state of charge meter is configured to operably sense a current of the second battery during charging/discharging of the second battery, so as to record charge quantities of the second battery, wherein in a situation where the second battery is configured to operably provide the supply power to the first mobile device and the second mobile device, the current of the second battery is substantially equal to the supply current.

In one embodiment, the charging control apparatus further comprises the second battery.

In one embodiment, when the step S1 is being executed, the second battery ceases being charged.

In one embodiment, the mobile charging circuit is configured as a linear charging circuit.

In one embodiment, in a case wherein it is determined that the first mobile device and the second mobile device are in the charging mode combination (0), the charging control apparatus ceases providing the supply power.

From another perspective, the present invention provides a charging control method, which is configured to operably provide a supply power to a first mobile device and a second mobile device, wherein each of the first and the second mobile device includes: a mobile charging circuit and a first battery, wherein each mobile charging circuit is configured to operably convert the supply power to a charging power for charging the corresponding first battery, wherein the mobile charging circuit is operable in at least two charging modes of a precharging (PC) mode, a constant current (CC) charging mode and a constant voltage (CV) charging mode, so as to charge the corresponding first battery; the charging control apparatus comprising: step S1: controlling the switching power converter to gradually adjust a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present: step S21: determining a charging mode combination where the first mobile device and the second mobile device are in; or step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

From yet another perspective, the present invention provides a charging system, comprising: a plurality of mobile devices, which include a first mobile device and a second mobile device, wherein each of the plurality of mobile devices includes: a mobile charging circuit; a first battery, wherein each mobile charging circuit is configured to operably convert a supply power to a charging power for charging the corresponding first battery, wherein the mobile charging circuit is operable in at least two charging modes of a precharging (PC) mode, a constant current (CC) charging mode and a constant voltage (CV) charging mode, so as to charge the corresponding first battery; and a charging control apparatus, which is coupled to the plurality of mobile devices in a removable way, wherein the charging control apparatus is configured to operably provide the supply power to the first mobile device and the second mobile device, wherein the charging control apparatus includes: a switching power converter, which is configured to operably convert an input power to the supply power, wherein the supply power has a supply voltage and a supply current; and a conversion control circuit, which is configured to operably control the switching power converter; wherein the conversion control circuit is configured to operably control the switching power converter according to the following steps: step S1: controlling the switching power converter to gradually adjust a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present: step S21: determining a charging mode combination where the first mobile device and the second mobile device are in; or step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

The objectives, technical details, features, and effects of the present invention will be better understood with regard to the detailed description of the embodiments below, with reference to the attached drawings.

BRIEF DESCRIPTION OF THE DRAWINGS

FIG. 11 shows a table that is a general list of mode inflection points versus various charging modes in which the two mobile devices operate.

FIG. 14A shows a flowchart illustrating a further specific embodiment of how a conversion control circuit controls a switching power converter.

FIG. 14B shows a flowchart illustrating a further specific embodiment of how a conversion control circuit controls a switching power converter.

FIG. 14C shows a flowchart illustrating a specific embodiment of how a conversion control circuit controls a switching power converter.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
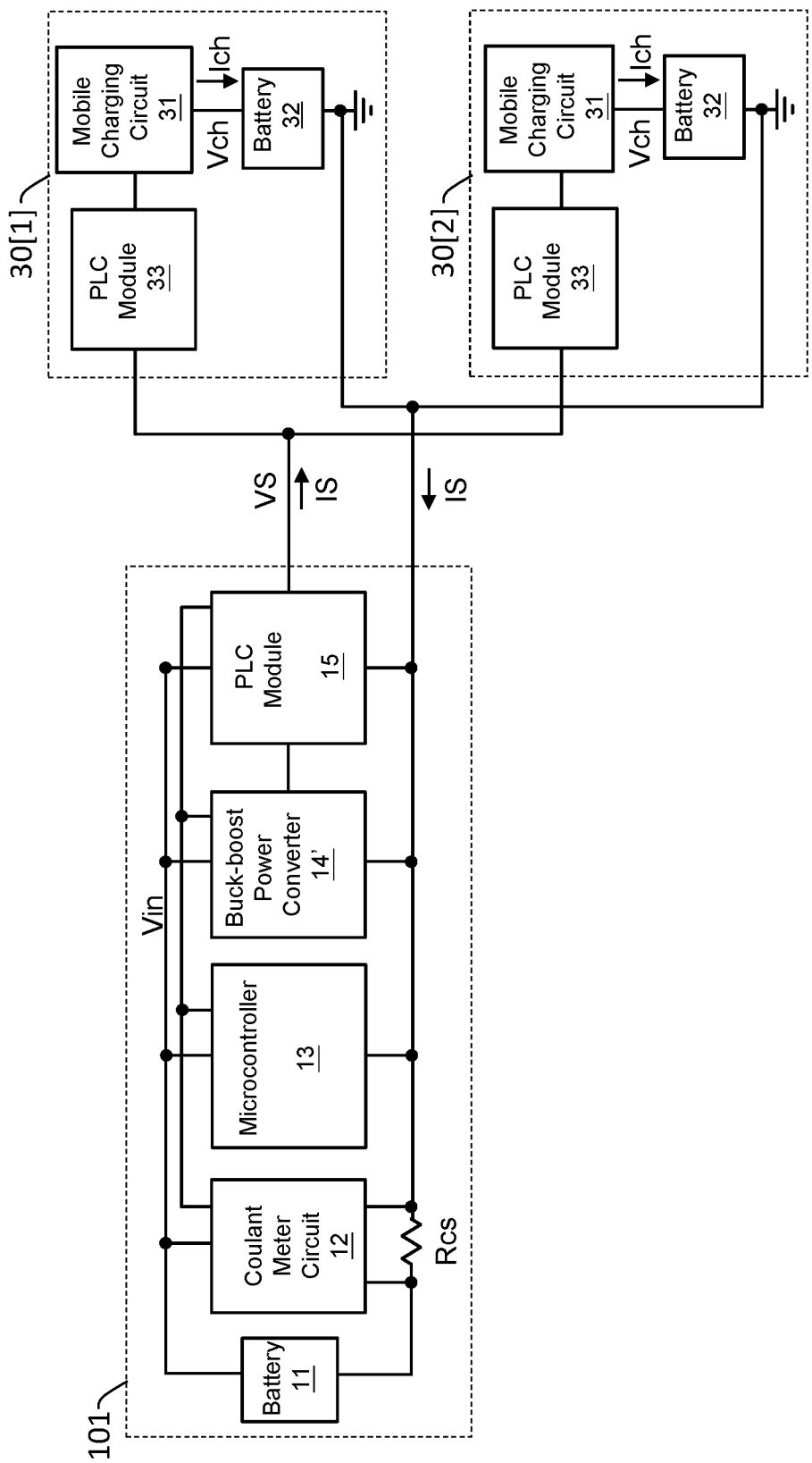
FIG. 1 shows a schematic block diagram of a conventional charging control apparatus for use in a mobile device.
Figure 2:
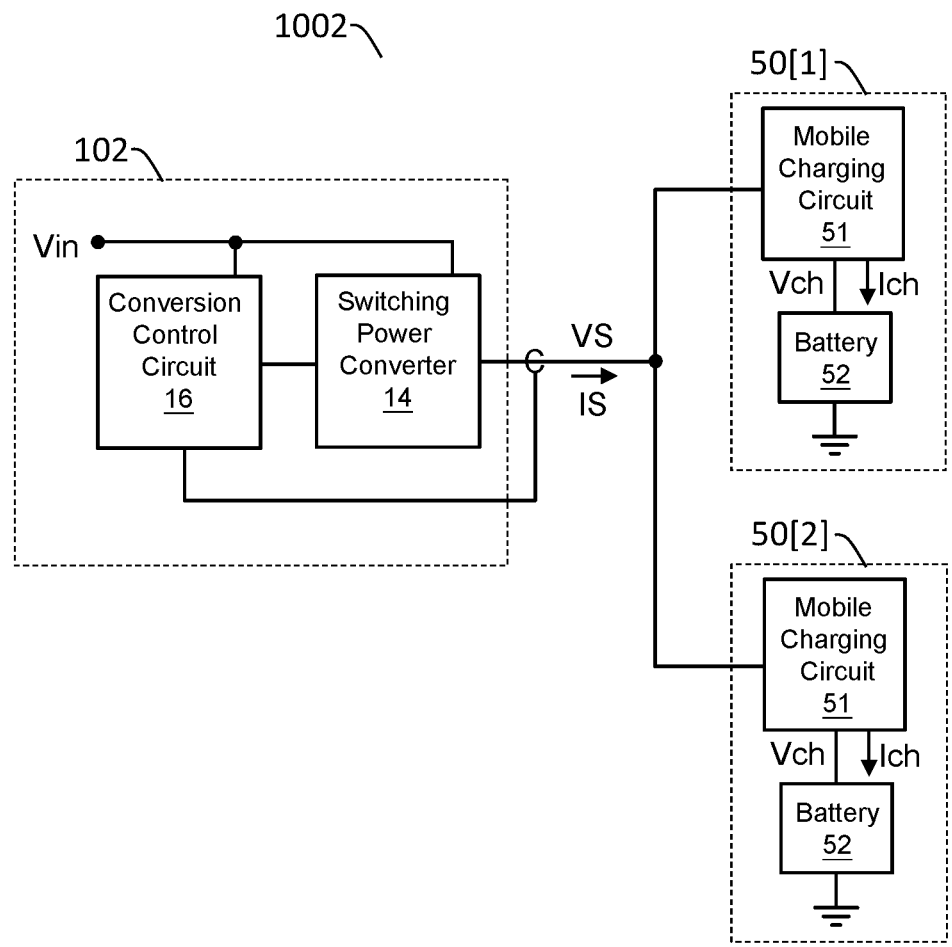
FIG. 2 shows a schematic block diagram of a charging control apparatus for use in a charging system according to an embodiment of the present invention.

Please refer to FIG. 2, which shows a schematic block diagram of a charging control apparatus (i.e., charging control apparatus 102) for use in a charging system (i.e., charging system 1002) according to an embodiment of the present invention. In one embodiment, the charging control apparatus 102 can be for example a charging box. The mobile devices 50[1] and 50[2] can be for example true wireless stereo (TWS) headphones. In one embodiment, the charging control apparatus 102 includes: a conversion control circuit 16 and a switching power converter 14. Each of the mobile devices 50[1] and 50[2] includes: a mobile charging circuit 51 and a battery 52.

In one embodiment, the switching power converter 14 can be implemented as for example a buck-boost switching power converter. The switching power converter 14 is configured to operably convert an input power Vin to the supply power (which includes a supply voltage VS and a supply current IS). The conversion control circuit 16 is configured to operably control the switching power converter 14. The mobile charging circuit 51 of each of the mobile devices 50[1] and 50[2] can convert the supply power to a corresponding charging power (which includes a charging voltage Vch and a charging current Ich), to charge the corresponding battery 52.

In one embodiment, the switching power converter 14 can be implemented as for example a buck-boost switching power converter, a buck switching power converter, a boost switching power converter or any other type of switching power converter. In one embodiment, the mobile charging circuit 51 can be implemented as for example a linear type charging circuit, which is only an illustrative example, but not for limiting the scope of the present invention. In other embodiments, the mobile charging circuit 51 can be implemented as for example a switching type charging circuit. In a case wherein the mobile charging circuit 51 is implemented as a linear type charging circuit, the power loss of the mobile device is positively correlated with a voltage drop across the mobile charging circuit 51. Under such circumstance, the present invention is particularly advantageous.

Figure 3:
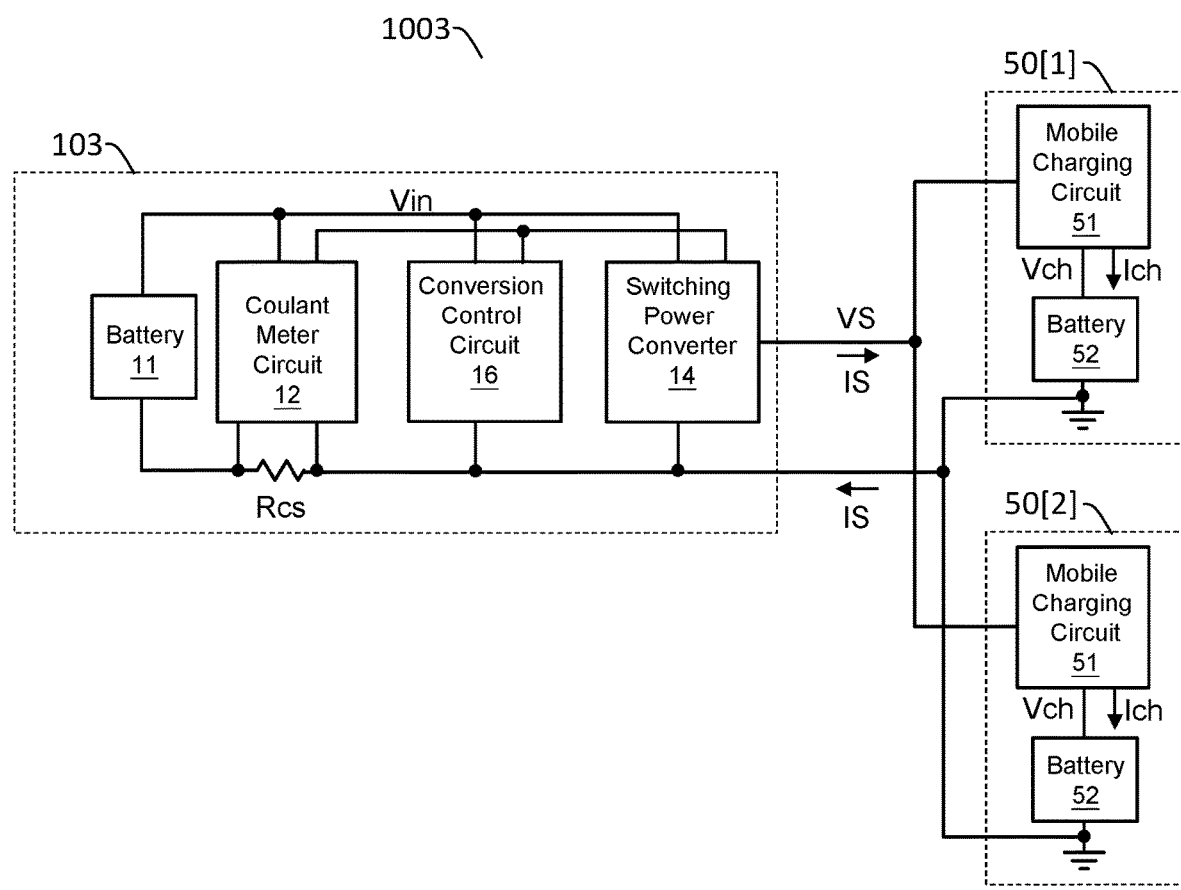
FIG. 3 shows a schematic block diagram of a charging control apparatus for use in a charging system according to another embodiment of the present invention.

Please refer to FIG. 3 which shows a schematic block diagram of a charging control apparatus (i.e., charging control apparatus 103) for use in a charging system (i.e., charging system 1003) according to another embodiment of the present invention. The charging control apparatus 103 of this embodiment shown in FIG. 3 is similar to the charging control apparatus 102 of the embodiment shown in FIG. 2, but is different in that: the charging control apparatus 103 of this embodiment further includes a state of charge meter circuit 12. In this embodiment, the battery 11 supplies the above-mentioned input power Vin to a switching power converter 14, and the battery 11 can be charged by an external power. The state of charge meter circuit 12 is coupled between the battery 11 and the conversion control circuit 16. when the charging control apparatus 103 controls the battery 11 to be charged or discharged, the state of charge meter circuit 12 is configured to operably sense a current of the battery 11 via for example a sensing resistor Rcs, so as to record the charge quantity of the battery 11. In a case wherein a supply power is supplied to the mobile devices 50[1] and 50[2] while in the meantime the battery 11 is not being charged, the current flowing from the battery 11 corresponds to a supply current IS. In other words, when establishing a current versus voltage characteristic curve corresponding of the supply power, the charging control apparatus 103 can measure and obtain the supply current IS via the state of charge meter circuit 12.

In one embodiment, the above-mentioned charging control apparatus 102 shown in FIG. 2 or the above-mentioned charging control apparatus 103 shown in FIG. 3 can be integrated into an integrated circuit (IC), excluding the battery 11.

Please still refer to FIG. 3. In one embodiment, the charging control apparatus 103 can further comprise the above-mentioned battery 11. Under such circumstance, the charging control apparatus 103 can be, for example, a charging box having a rechargeable battery 11.

Figure 4:
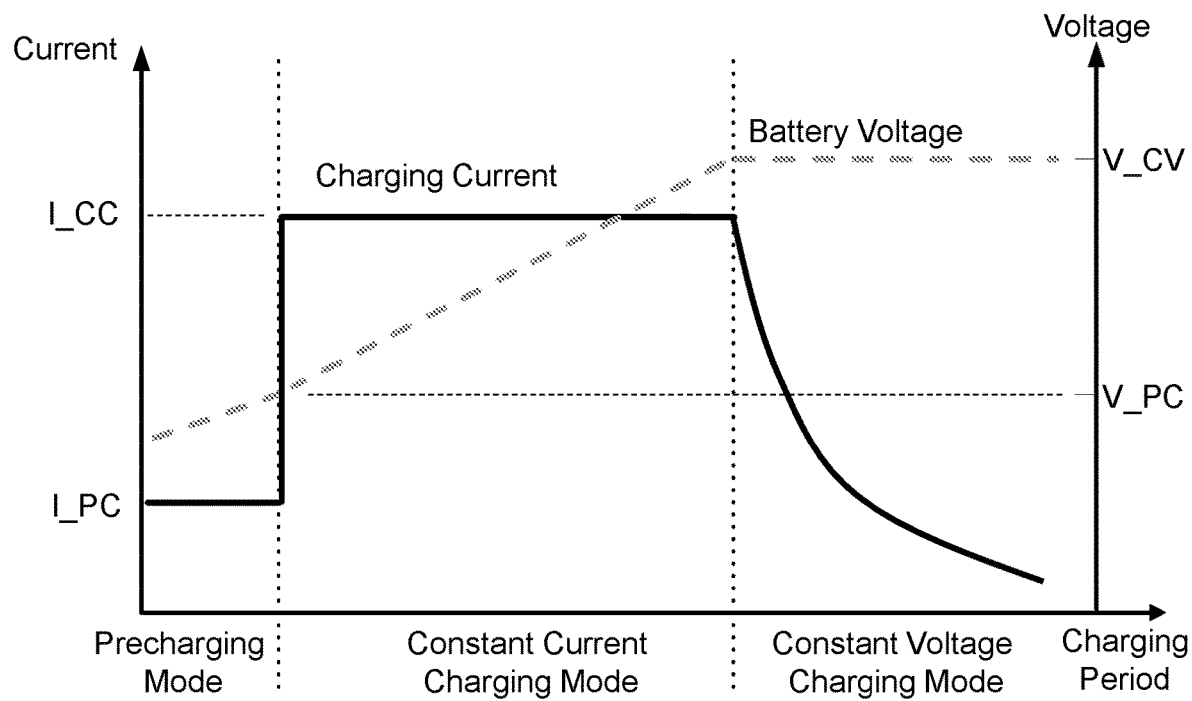
FIG. 4 shows an embodiment of a current versus voltage characteristic curve which is indicative of a mobile charging circuit charging a battery.

Please refer to FIG. 4, which shows an embodiment of a current versus voltage characteristic curve which is indicative of a mobile charging circuit charging a battery. In one embodiment, the mobile charging circuit 51 of the mobile device (i.e., 50[1] and 50[2]) is operable in at least two of the following charging modes: a precharging (PC) mode, a constant current (CC) charging mode and a constant voltage (CV) charging mode, to charge the battery 52.

The mobile charging circuit 51 can decide which charging mode is to be adopted according to a status of the battery 52. As shown in FIG. 4, in one embodiment, when a voltage of the battery 52 is greater than a voltage level V_PC and smaller than a voltage level V_CV, the mobile charging circuit 51 will operate in a CC charging mode. Under such circumstance, the mobile charging circuit 51 will output for example a constant charging current Ich having a current level of I_CC, to charge the battery 52. When the voltage of the battery 52 reaches the voltage level V_CV, the mobile charging circuit 51 will operate in a CV charging mode. Under such circumstance, the mobile charging circuit 51 will charge the battery 52 by a constant charging voltage Vch having a voltage level of V_CV. When the voltage of the battery 52 is smaller than the voltage level V_PC, the mobile charging circuit 51 will operate in a PC mode. Under such circumstance, the mobile charging circuit 51 will output for example a constant charging current Ich having a current level of I_PC, to charge the battery 52. Generally speaking, the current level of I_PC current is smaller than the current level of I_CC. In one embodiment, the current level of I_PC can be, for example but not limited to, 1/10 of the current level of I_CC.

Figure 5A:
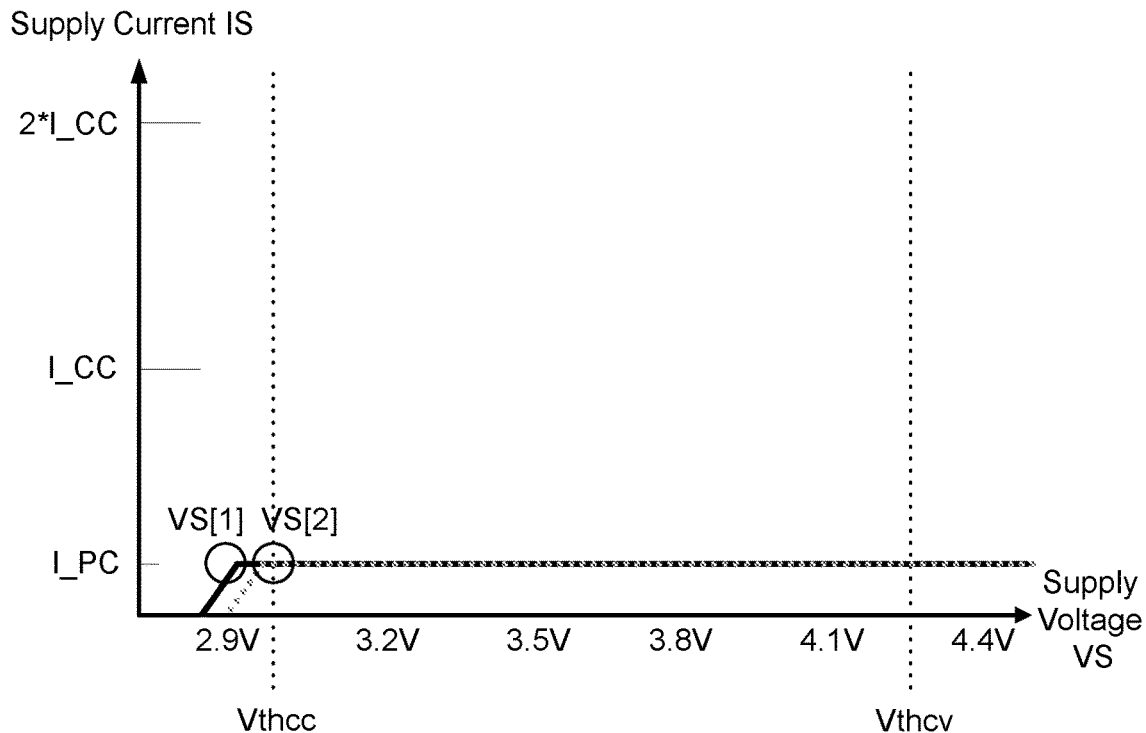
FIG. 5A to FIG. 5C show several embodiments of characteristic curves of supply current IS versus supply voltage VS which are indicative of a mobile charging circuit charging different batteries in several charging modes, respectively.

Please refer to FIG. 5A, which shows two embodiments of characteristic curves of supply current IS versus supply voltage VS, indicative of a mobile charging circuit charging different batteries having different charge quantities in the above-mentioned different charging modes. As shown in FIG. 5A, in a case wherein the supply voltage VS is inadequately low, because the mobile charging circuit 51 is unable to operate normally, the supply current IS is zero. On the other hand, in a case wherein the supply voltage VS is sufficiently high, the mobile charging circuit 51 starts supplying the supply current IS to the battery 52. Under such circumstance, the supply current IS increases as the supply voltage VS increases. Subsequently, at a mode inflection point of the characteristic curve, the mobile charging circuit 51 starts charging the battery 52 via a constant charging current Ich having a current level of I_PC. Under such circumstance, the current level of the supply current IS is substantially equal to the current level of I_PC, and the supply current IS does not increase as the supply voltage VS increases. It is noteworthy that, in one embodiment, when the mobile charging circuit 51 operates in a PC mode, the supply voltage VS corresponding to the mode inflection point is relatively lower. FIG. 5A is taken herein as an example, in this embodiment, in the PC mode, the supply voltage VS[1] and the supply voltage VS[2] at their respective mode inflection points are both approximately equal to 2.9V. The supply voltage VS[1] and the supply voltage VS[2] correspond to different mobile charging circuits and/or different batteries, respectively.

Figure 5B:
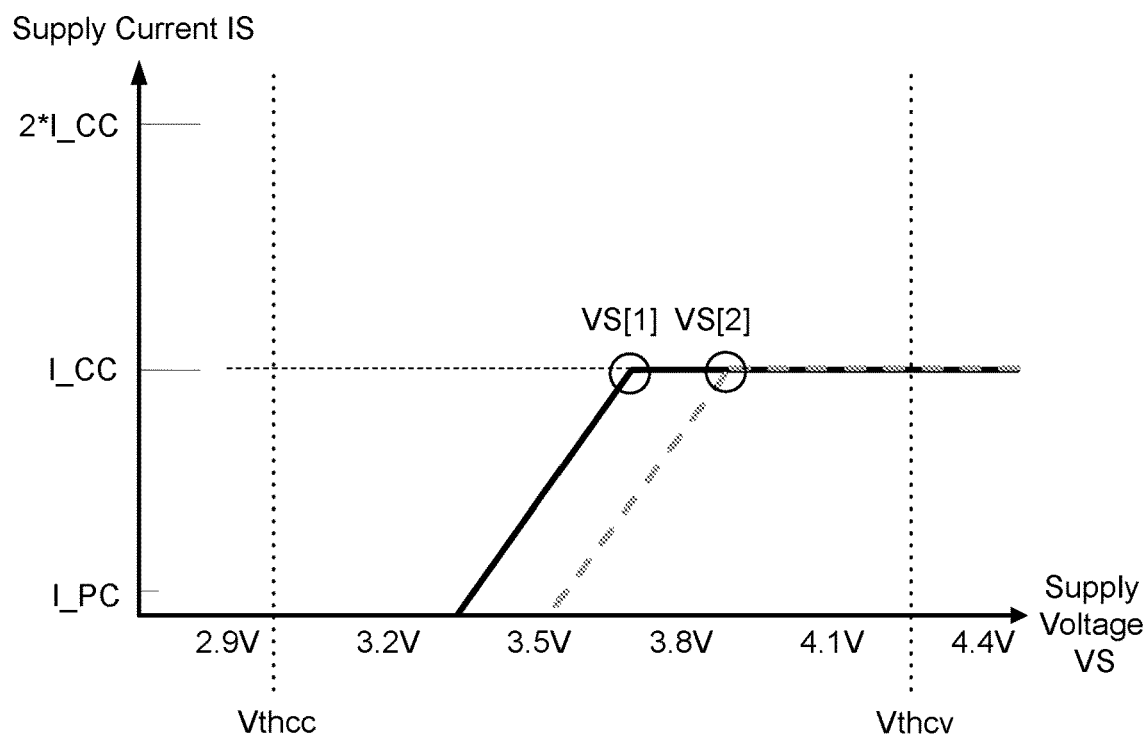

Please refer to FIG. 5B, which show two embodiments of characteristic curves of supply current IS versus supply voltage VS, indicative of a mobile charging circuit charging different batteries having different charge quantities in a constant current (CC) charging mode. As shown in FIG. 5B, in a case wherein the supply voltage VS is inadequately low, because the mobile charging circuit 51 is unable to operate normally, the supply current IS is zero. On the other hand, in a case wherein the supply voltage VS is sufficiently high, the mobile charging circuit 51 starts supplying the supply current IS to the battery 52. Under such circumstance, the supply current IS increases as the supply voltage VS increases. Subsequently, at a mode inflection point of the characteristic curve, the mobile charging circuit 51 starts charging the battery 52 via a constant charging current Ich having a current level of I_CC. Under such circumstance, the current level of the supply current IS is substantially equal to the current level of I_CC, and the supply current IS does not increase as the supply voltage VS increases. It is noteworthy that, in one embodiment, when the mobile charging circuit 51 operates in the CC mode, the supply voltage VS corresponding to the mode inflection point is higher than in the PC mode. FIG. 5B is taken herein as an example. In this embodiment, in the CC mode, the mode inflection points of the supply voltages (VS[1] and VS[2]) corresponding to different mobile charging circuits and/or different batteries both exceed a CC voltage threshold Vthcc but does not exceed a CV voltage threshold Vthcv. Besides, because the batteries have different charge quantities, the mode inflection point of the supply voltage VS[1] is different from the mode inflection point of the supply voltage VS[2]. However, the mode inflection points of the supply voltages VS[1] and VS[2] both lie between the CC voltage threshold Vthcc and the CV voltage threshold Vthcv.

Figure 5C:
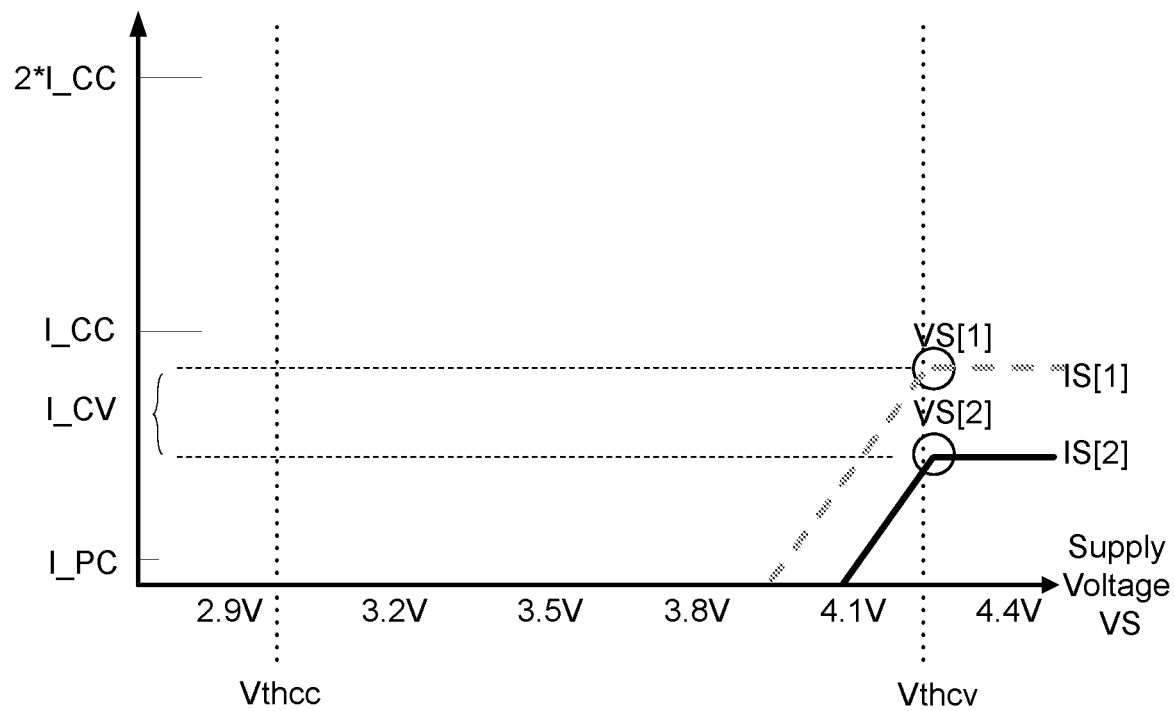

Please refer to FIG. 5C, which show two embodiments of characteristic curves of supply current IS versus supply voltage VS, indicative of a mobile charging circuit charging different batteries having different charge quantities in a constant voltage (CV) charging mode. As shown in FIG. 5C, in a case wherein the supply voltage VS is inadequately low, because the mobile charging circuit 51 is unable to operate normally, the supply current IS is zero. On the other hand, in a case wherein the supply voltage VS is sufficiently high, the mobile charging circuit 51 starts supplying the supply current IS to the battery 52. Under such circumstance, the supply current IS increases as the supply voltage VS increases. Subsequently, at a mode inflection point of the characteristic curve, the mobile charging circuit 51 starts charging the battery 52 via a charging current Ich having a current level which lies between a current level of I_PC and a current level of I_CC. Under such circumstance, the current level of the supply current IS is substantially a constant during a short time period. And, the supply current IS does not increase as the supply voltage VS increases. It is noteworthy that, in one embodiment, when the mobile charging circuit 51 operates in the CV mode, the supply voltage VS corresponding to the mode inflection point is relatively higher and is almost a constant for different batteries. FIG. 5C is taken herein as an example. In this embodiment, in the CV mode, the mode inflection points of the supply voltages (VS[1] and VS[2]) corresponding to different mobile charging circuits and/or different batteries both exceed the CV voltage threshold Vthcv. In this embodiment, in the CV mode, the supply voltage VS[1] and the supply voltage VS[2] corresponding to the mode inflection points are both approximately equal to 4.2V. Besides, because the batteries have different charge quantities, the supply current IS[1] at the mode inflection point is different from the supply current IS[2] at the mode inflection point. However, the supply currents IS[1] and IS[2] at their respective mode inflection points both lie between the above-mentioned current level of I_PC and the above-mentioned current level of I_CC.

It is noteworthy that, the above-mentioned characteristic curves shown in FIG. 5A to FIG. 5C are obtained by executing a short scan upon different mobile devices (including a corresponding mobile charging circuit and a corresponding battery), and the scan is completed during a sufficiently short time period so as not to cause the charge quantities of the battery to change significantly. During measurements to obtain the characteristic curves shown in FIG. 5A to FIG. 5C, one can measure the supply current IS by controlling the supply voltage VS to vary, and can measure the supply voltage VS by controlling the supply current IS to vary.

Note that the above-mentioned term "mode inflection point" is defined as a point where the current versus voltage characteristic curve transits from a positive slop to zero, according to the coordinate system as shown in FIG. 5A to FIG. 5C.

In regard to a specific mobile device, the above-mentioned CC voltage threshold Vthcc can be a determination voltage threshold which distinguishes a PC mode of this specific mobile device from a CC mode of this specific mobile device; the above-mentioned CV voltage threshold Vthcv can be a determination voltage threshold which distinguishes a CC mode of this specific mobile device from a CV mode of this specific mobile device.

FIG. 6A, FIG. 7A, FIG. 8A, FIG. 9A and FIG. 10A show several embodiments of current versus voltage characteristic curves in different cases wherein two mobile devices (i.e., mobile device 50[1] and mobile device 50[2]) are each in a same or different charging mode. FIG. 6B, FIG. 7B, FIG. 8B, FIG. 9B and FIG. 10B show several embodiments of current versus voltage characteristic curves corresponding to a supply power, which are indicative of different cases wherein the supply power is simultaneously provided to two mobile devices (i.e., mobile device 50[1] and mobile device 50[2]) in correspondence to FIG. 6A, FIG. 7A, FIG. 8A, FIG. 9A and FIG. 10A, respectively.

Figure 6A:
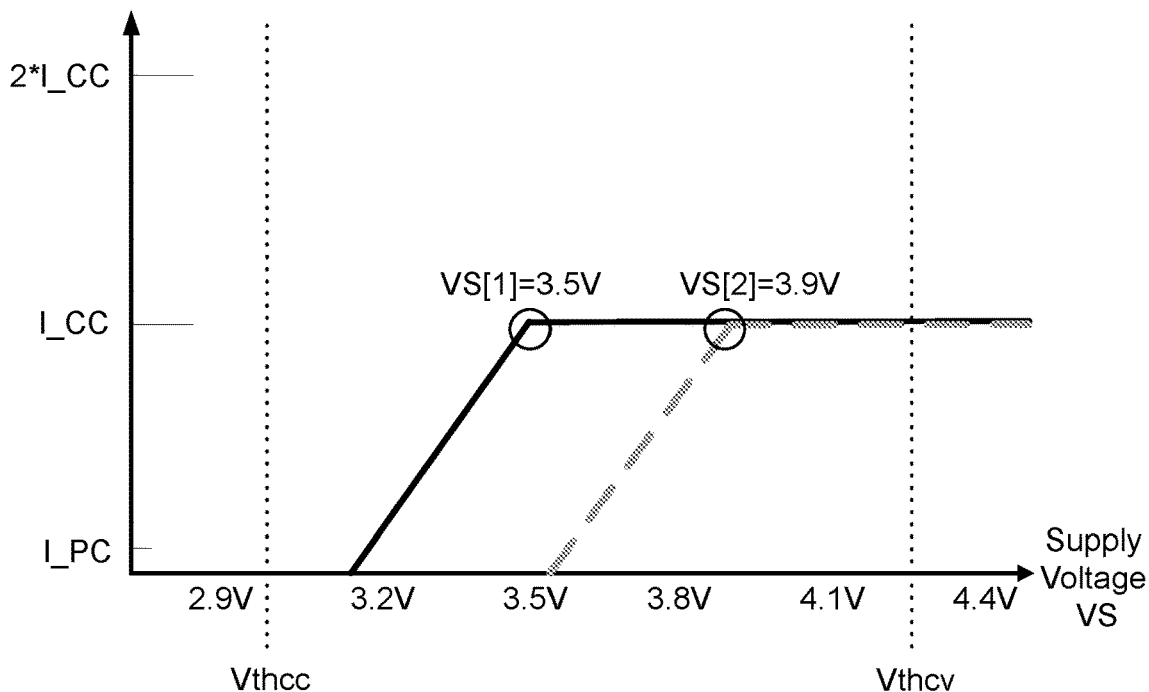
FIG. 6A, FIG. 7A, FIG. 8A, FIG. 9A and FIG. 10A show several embodiments of current versus voltage characteristic curves of a supply power in different cases wherein the two mobile devices are each in a same or different charging mode.
Figure 6B:
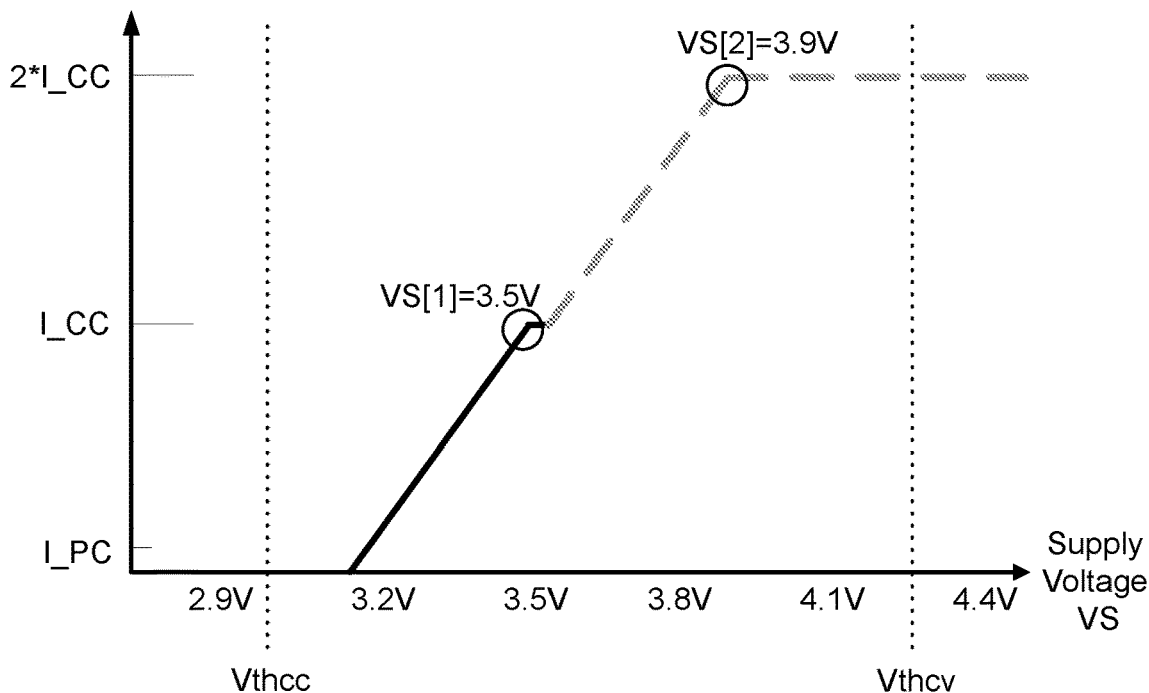
FIG. 6B, FIG. 7B, FIG. 8B, FIG. 9B and FIG. 10B show several embodiments of current versus voltage characteristic curves of a supply power, which are indicative of different cases wherein the supply power is simultaneously provided to two mobile devices in correspondence to FIG. 6A, FIG. 7A, FIG. 8A, FIG. 9A and FIG. 10A, respectively.

In one embodiment, as shown in FIG. 6A, the mobile devices 50[1] and 50[2] are both in the CC charging mode. When one supply power provides power to both the mobile devices 50[1] and 50[2], a corresponding current versus voltage characteristic curve is as shown in FIG. 6B. In one embodiment, the current versus voltage characteristic curve shown in FIG. 6B has two inflection points. The supply voltage VS and the supply current IS corresponding to a first mode inflection point are 3.5V and I_CC, respectively. The supply voltage VS and the supply current IS corresponding to a second mode inflection point are 3.9V and 2*I_CC, respectively. In another embodiment, when the mobile devices 50[1] and 50[2] are both in the CC charging mode, it is also possible that the current versus voltage characteristic curve shown in FIG. 6B has only one inflection point. Under such situation, the inflection point corresponding to the mobile device 50[1] and the inflection point corresponding to the mobile device 50[2] coincide with each other.

Figure 7A:
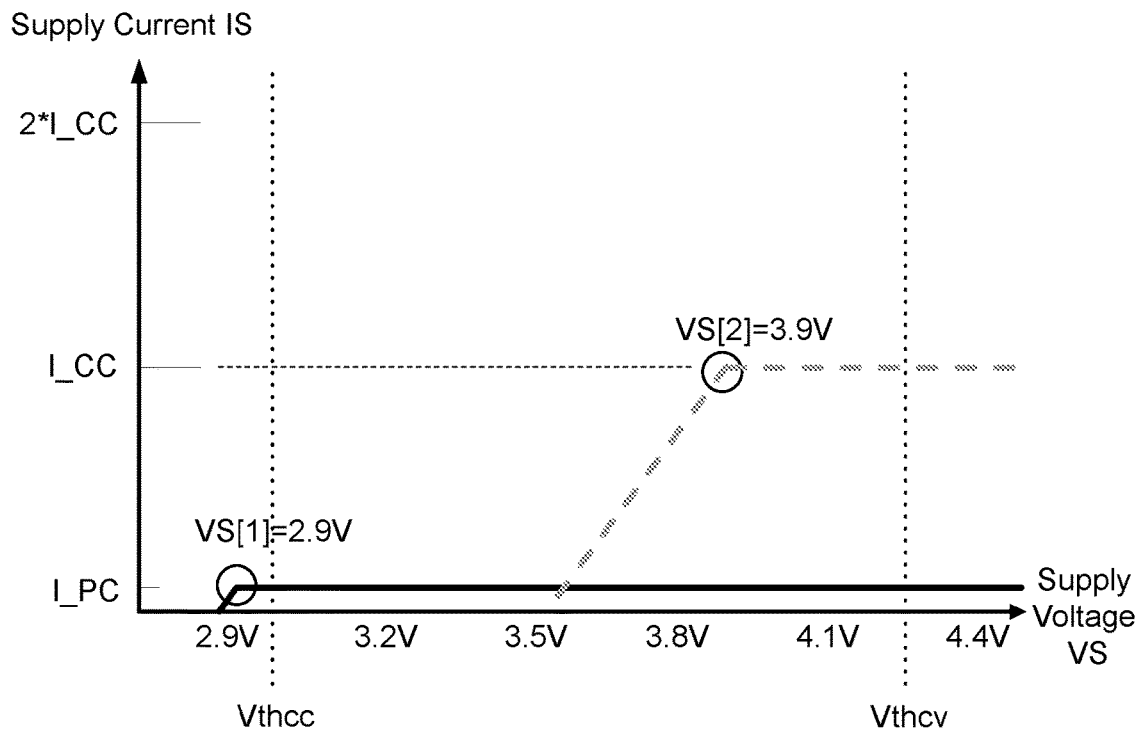
Figure 7B:
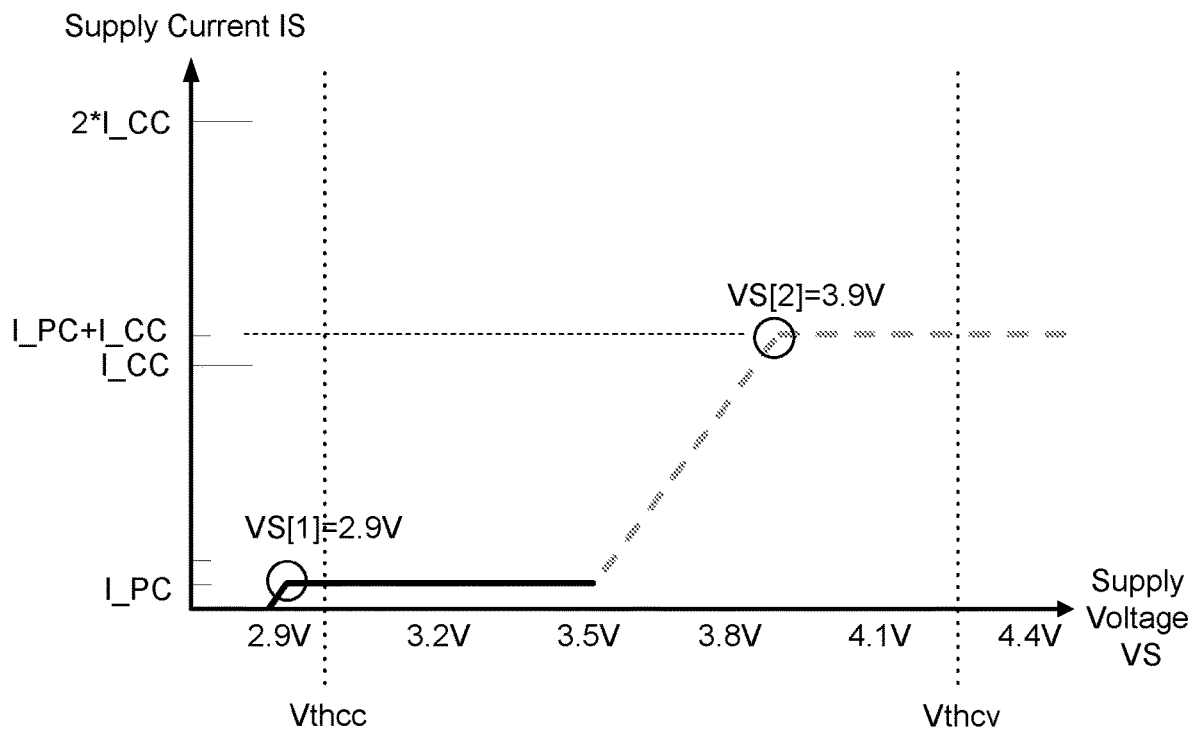

In the embodiment shown in FIG. 7A and FIG. 7B, the mobile device 50[1] and the mobile device 50[2] are in the PC mode and the CC charging mode, respectively. In one embodiment, the current versus voltage characteristic curve shown in FIG. 7B has two inflection points. The supply voltage VS and the supply current IS corresponding to a first mode inflection point are 2.9V and I_PC, respectively. The supply voltage VS and the supply current IS corresponding to a second mode inflection point are 3.9V and I_PC+I_CC, respectively.

Figure 8A:
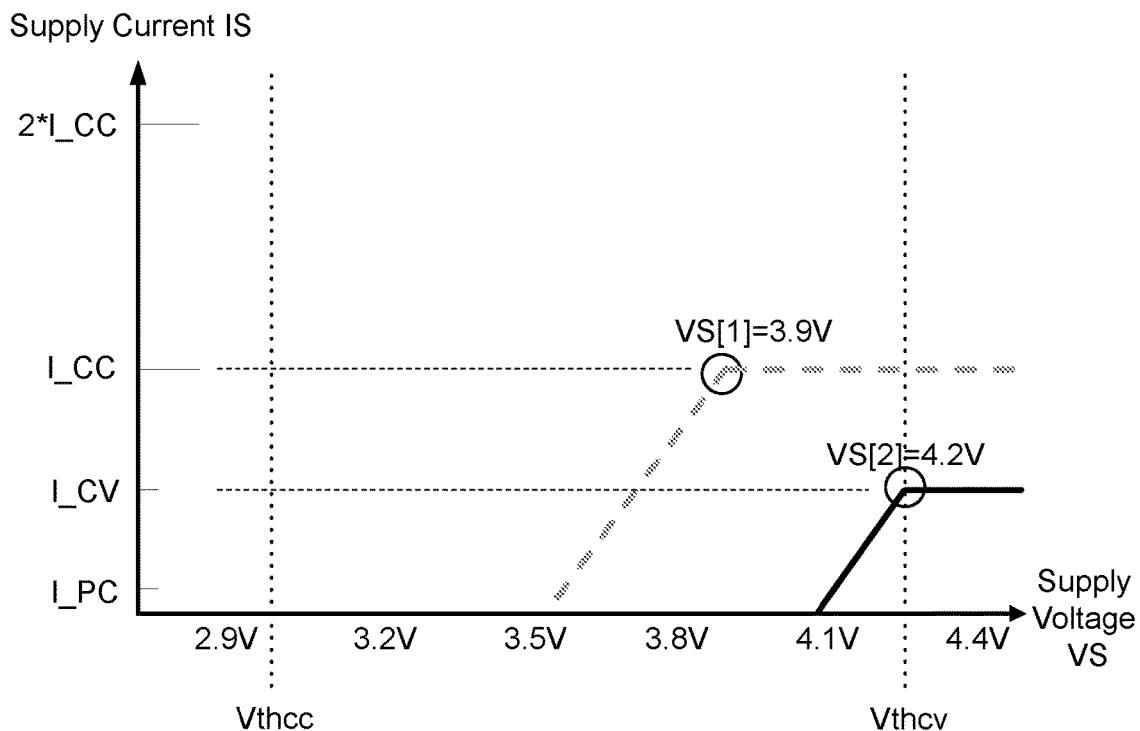
Figure 8B:
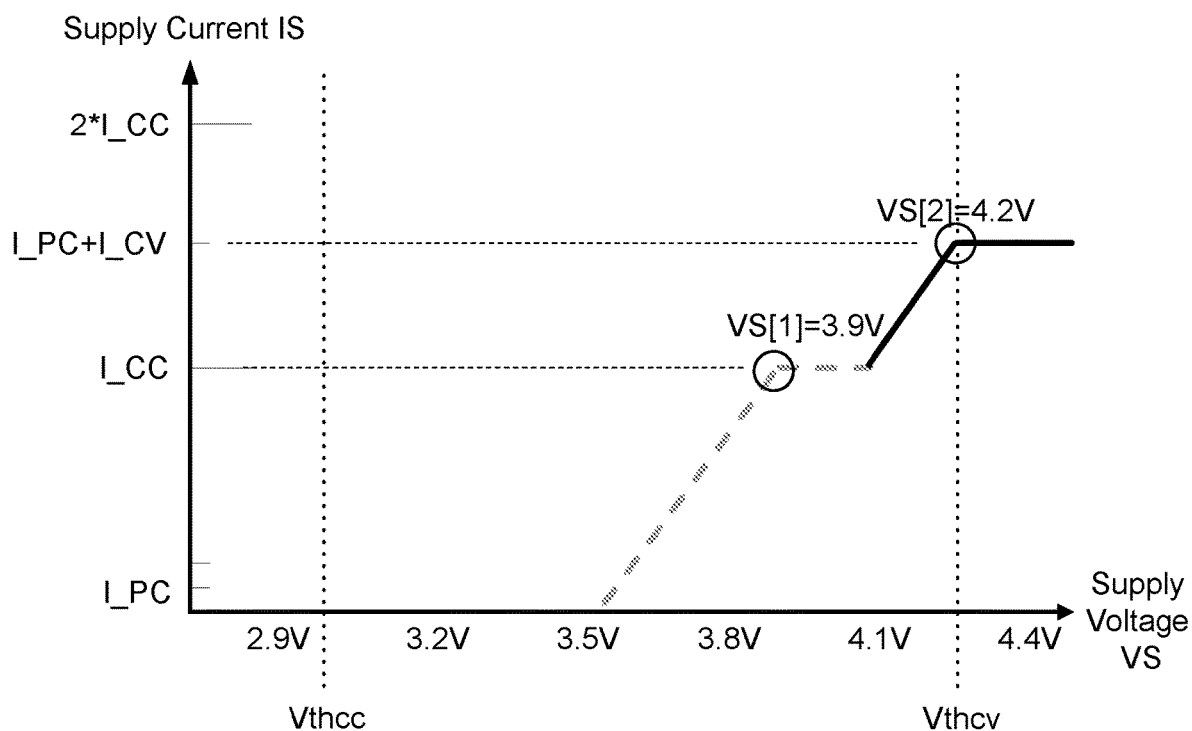

In the embodiment shown in FIG. 8A and FIG. 8B, the mobile device 50[1] and the mobile device 50[2] are in the CC charging mode and the CV charging mode, respectively. In one embodiment, the current versus voltage characteristic curve shown in FIG. 8B has two inflection points. The supply voltage VS and the supply current IS corresponding to a first mode inflection point are 3.9V and I_CC, respectively. The supply voltage VS and the supply current IS corresponding to a second mode inflection point are 4.2V and I_CC+I_CV, respectively. In one embodiment, the current level of I_CV lies between the current level of I_PC and the current level of I_CC.

Figure 9A:
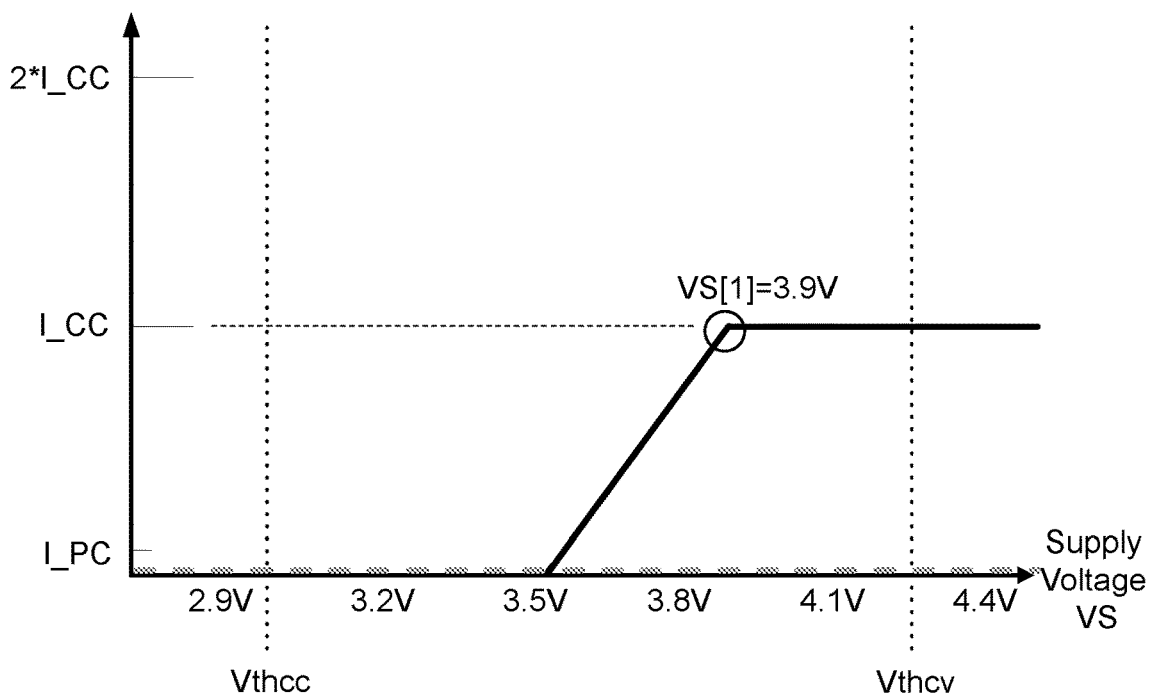
Figure 9B:
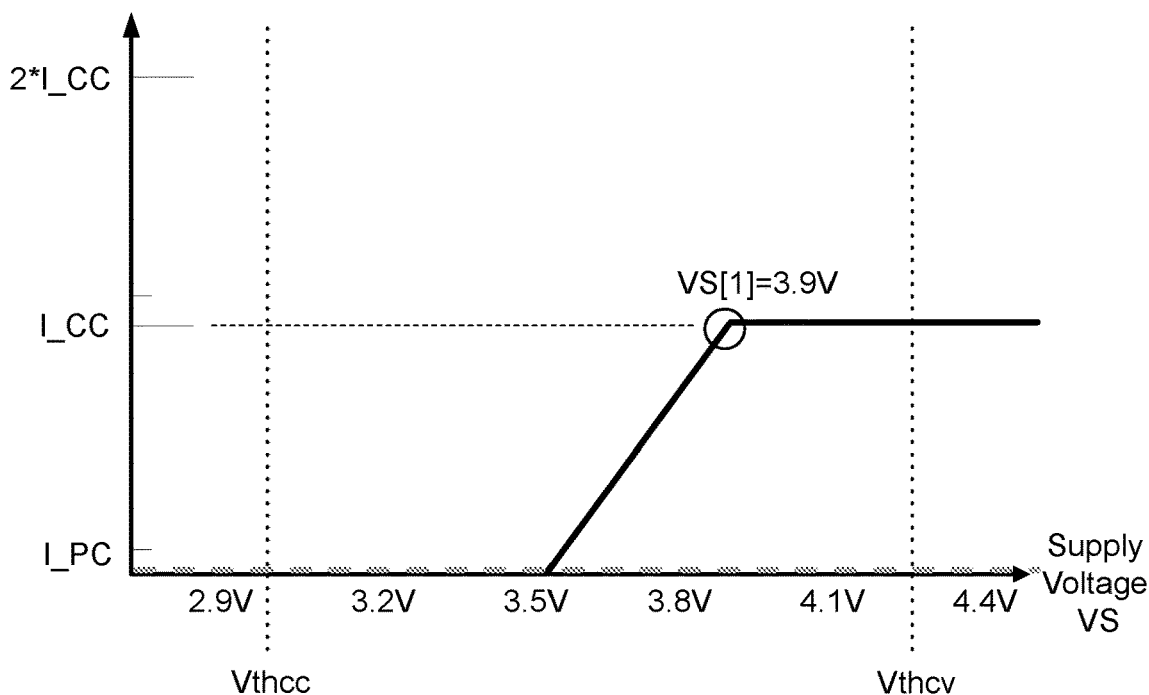

In the embodiment shown in FIG. 9A and FIG. 9B, the mobile device 50[1] and the mobile device 50[2] are in the CC charging mode and a charging termination mode, respectively. In one embodiment, the current versus voltage characteristic curve shown in FIG. 9B has one single inflection point. The supply voltage VS and the supply current IS corresponding to this one single mode inflection point are 3.9V and I_CC, respectively.

Figure 10A:
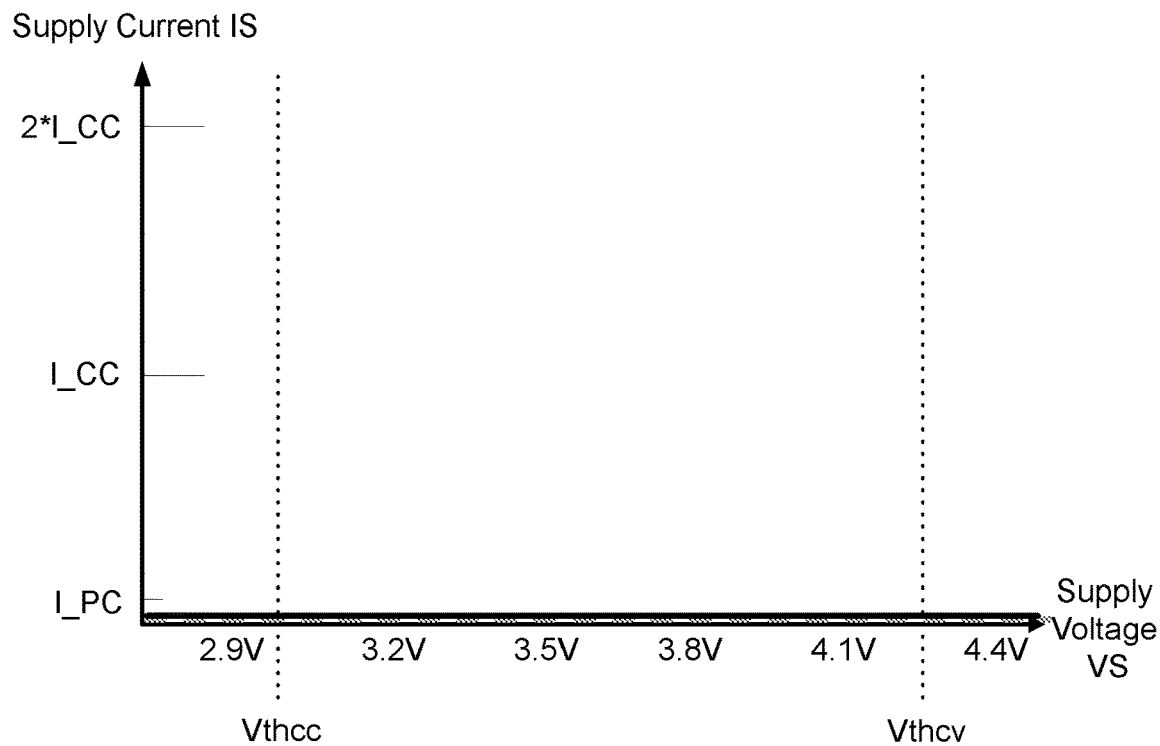
Figure 10B:
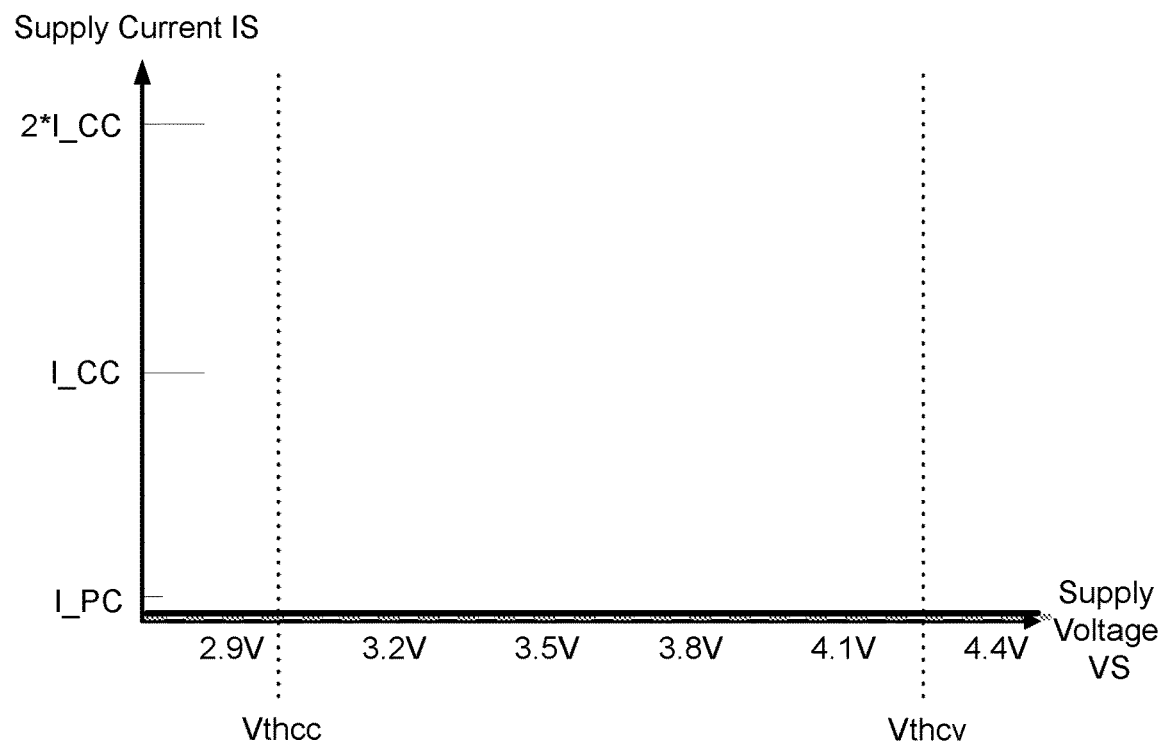

In the embodiment shown in FIG. 10A and FIG. 10B, the mobile device 50[1] and the mobile device 50[2] are both in the charging termination mode. In one embodiment, the current versus voltage characteristic curve shown in FIG. 10B does not have any inflection point. As shown in FIG. 10B, within the voltage scanning range of the supply voltage VS, the supply current IS remains as zero.

It is noteworthy that the voltage level of 2.9V in the above-mentioned preferred embodiment is only an illustrative example, but not for limiting the broadest scope of the present invention. The voltage level of 2.9V corresponds to the above-mentioned voltage V_PC, which can be referred to as a PC mode inflection point voltage, wherein the PC mode inflection point voltage V_PC is lower than the CC voltage threshold Vthcc. Besides, it is noteworthy that the voltage level of 4.2V in the above-mentioned preferred embodiment is only an illustrative example, but not for limiting the broadest scope of the present invention. The voltage level of 4.2V corresponds to the above-mentioned voltage V_CV, which can be referred to as a CV charging mode inflection point voltage, wherein the CV charging mode inflection point voltage V_CV is higher than the CV voltage threshold Vthcv. Moreover, it is noteworthy that the voltage level of 3.9V in the above-mentioned preferred embodiment is only an illustrative example, but not for limiting the broadest scope of the present invention. The voltage level of 3.9V corresponds to the above-mentioned voltage V_CC, which can be referred to as a CC charging mode inflection point voltage, wherein the CC charging mode inflection point voltage V_CC lies between the CC voltage threshold Vthcc and the CV voltage threshold Vthcv.

It is required for the supply current IS to not only supply the charging current Ich, but also supply operation currents to circuits (e.g., mobile charging circuit 51) inside the mobile devices 50[1] and 50[2], for these circuits to operate by. Therefore, it is noteworthy that the aforementioned current level of I_PC, I_CC, I_CV and zero of the supply current IS are the net numbers wherein the operation currents have been deducted.

From FIG. 6A to FIG. 10A, FIG. 6B to FIG. 10B and the corresponding description, it can be understood that: in a case wherein plural mobile devices are supplied with the supply power simultaneously, a current versus voltage characteristic curve corresponding to the supply power is actually a superposition of plural current versus voltage characteristic curves of the cases by which each mobile device is individually supplied with the supply power. Given this feature, according to the present invention, the charging control apparatus can determine which charging mode combination the plural mobile devices are in according to the following: (1) whether any mode inflection point is present in the current versus voltage characteristic curve; (2) the current level of the supply current IS corresponding to the mode inflection point in the current versus voltage characteristic curve and/or (3) the voltage level of the supply voltage VS corresponding to the mode inflection point in the current versus voltage characteristic curve.

Please refer to FIG. 11, which shows a table that is a general list of mode inflection points versus various charging modes in which the two mobile devices operate. It should be understood that the implementations of the above-mentioned embodiments shown in FIG. 6A to FIG. 10A and FIG. 6B to FIG. 10B are only an illustrative example, but not for limiting the scope of the present invention.

As shown in FIG. 11, in a case wherein the charging control apparatus (e.g., charging control apparatus 102 shown in FIG. 2) provides a supply power to two mobile devices (e.g., the mobile device 50[1] and the mobile device 50[2] shown in FIG. 2), there are at least ten possible mode combinations (i.e., mode combination (0) to mode combination (9)) according to the relationship between the mode inflection point(s) in the current versus voltage characteristic curve and the combinations of the charging modes.

The abbreviations in the table shown in FIG. 11 are explained below: in the column of "charging mode combinations for the mobile device": NC means not charging, denoting that the mobile device is in a charging termination mode; PC denotes that the mobile device is in a precharging (PC) mode; CC denotes that the mobile device is in a constant current (CC) charging mode; CV denotes that the mobile device is in a constant voltage (CV) charging mode. The supply voltage VS and the supply current IS corresponding to the first mode inflection point in the current versus voltage characteristic curve of the supply power are denoted as "VS[1]" and "IS[1]", respectively. The supply voltage VS and the supply current IS corresponding to the second mode inflection point in the current versus voltage characteristic curve of the supply power are denoted as "VS[2]" and "IS[2]", respectively. "none" denotes that there is no mode inflection point in the current versus voltage characteristic curve of the supply power, as illustrated by the mode combination (0).

In more detail, as shown in FIG. 11, in one embodiment, the charging control apparatus of the present invention can determine which charging mode combination the two mobile devices 50[1] and 50[2] are in according to the following: (1) whether the first mode inflection point and/or the second mode inflection point is present in the current versus voltage characteristic curve of the supply power; and (2) when at least one mode inflection point is present, the current level or the current range of the supply current IS[1] and/or IS[2] at or subsequent to the mode inflection point. For example, in the mode combination (3), the supply current IS[1] corresponding to the first mode inflection point has a current level of I_CC, while in the meantime, the second mode inflection point is absent in the mode combination (3). For another example, in the mode combination (5), the supply current IS[1] corresponding to the first mode inflection point has a current level of I_PC, whereas, the supply current IS[1] corresponding to the second mode inflection point has a current level between the current level of 2*I_PC to the current level of I_CC+I_PC. In one embodiment, the charging control apparatus of the present invention can determine which charging mode combination the two mobile devices 50[1] and 50[2] are in further according to the voltage level or the voltage range of the supply voltage VS[1] and/or VS[2] at the mode inflection point, if at least one mode inflection point is present.

For example, in a charging mode combination wherein a PC mode is included (e.g., the mode combination (4)), the supply voltage VS[1] corresponding to the first mode inflection point is smaller than the CC voltage threshold Vthcc. For another example, in the mode combination (8), the supply voltage VS[1] corresponding to the first mode inflection point lies between the CC voltage threshold Vthcc and the CV voltage threshold Vthcv, which corresponds to the CC charging mode, and also in the mode combination (8), the supply voltage VS[2] corresponding to the second mode inflection point is greater than the CV voltage threshold Vthcv, which corresponds to the CV charging mode. The rest of the mode combinations can be are not redundantly explained here, since they are self-explanatory.

Figure 12A:
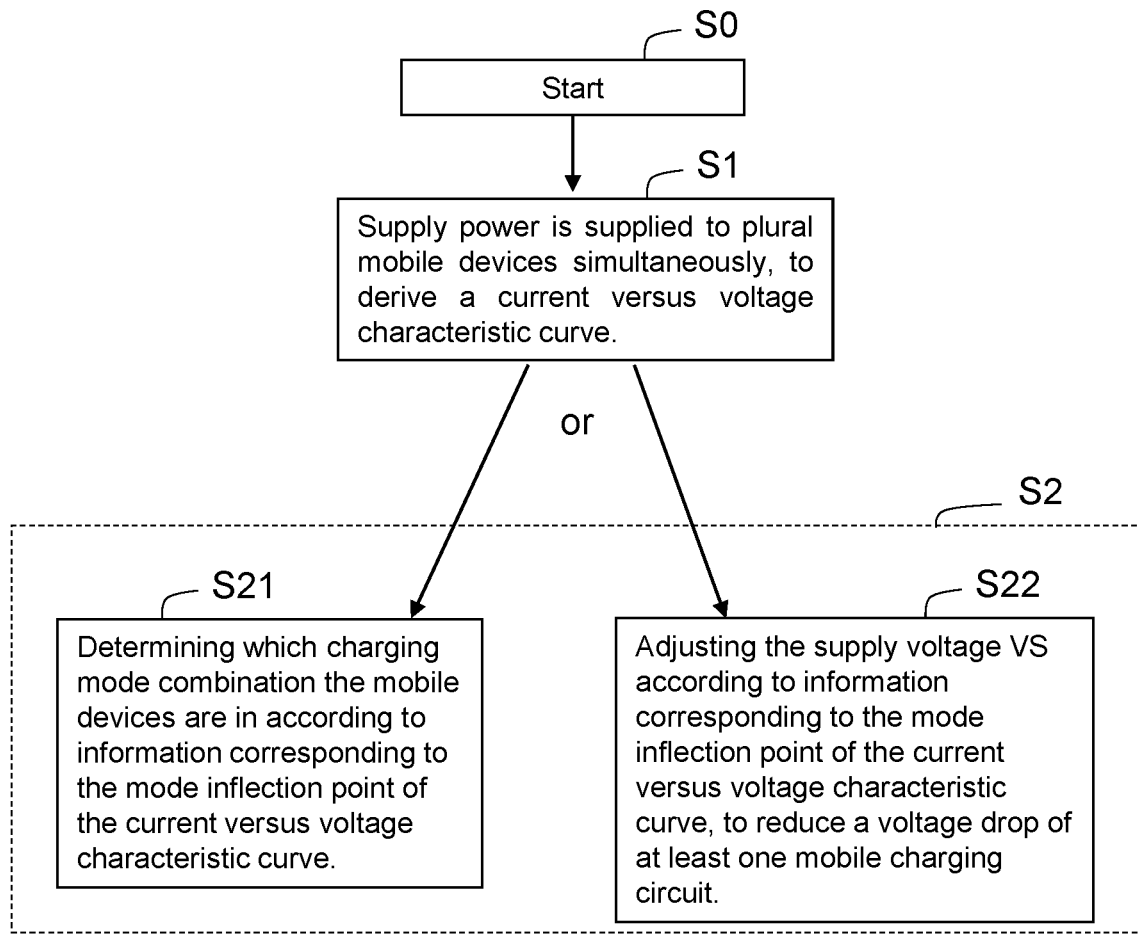
FIG. 12A to FIG. 12C show flowcharts illustrating several embodiments of how a charging control apparatus controls a switching power converter.
Figure 12B:
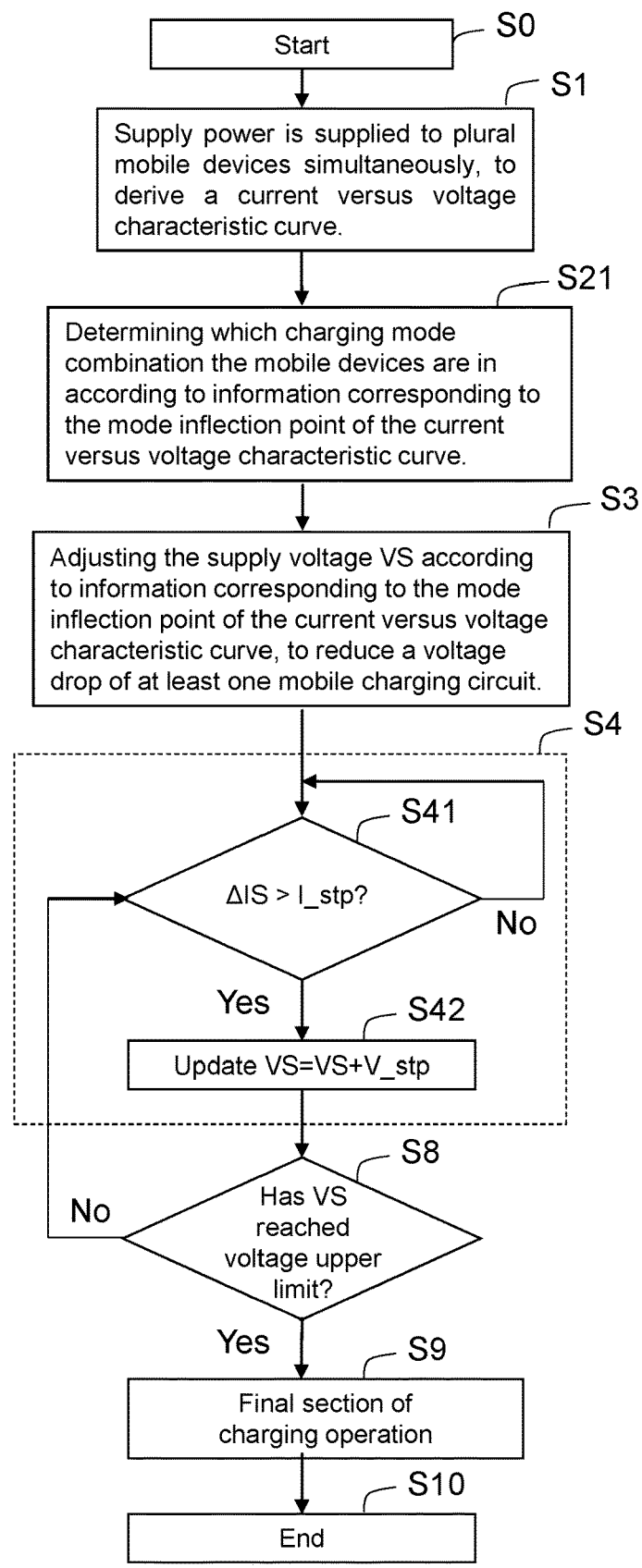

Please refer to FIG. 12A to FIG. 12B, which show flowcharts illustrating several embodiments of how a charging control apparatus controls a switching power converter.

Firstly, in the step S1, a current versus voltage characteristic curve corresponding to the supply power is established, wherein the supply power is supplied to plural mobile devices (e.g., the mobile device 50[1] and the mobile device 50[2]). In more detail, the current versus voltage characteristic curve corresponding to the supply power can be established by controlling a switching power converter (e.g., switching power converter 14) to gradually adjust the level of the supply voltage VS within a preset voltage range and sense the level of the corresponding supply current IS. Or alternatively, the current versus voltage characteristic curve corresponding to the supply power can be established by controlling a switching power converter (e.g., switching power converter 14) to gradually adjust the level of the supply current IS within a preset current range and sense the level of the corresponding supply voltage VS.

As shown in FIG. 12A, next, this embodiment proceeds to the step S2, to selectively perform one of the step S21 and the step S22 according to whether the current versus voltage characteristic curve has at least one mode inflection point and according to information indicated by the supply current IS and/or the supply voltage VS corresponding to the at least one mode inflection point in a situation where at least one mode inflection point is present.

Step S21: determining which charging mode combination the mobile device 50[1] and the mobile device 50[2] are in; or Step S22: in the situation where at least one mode inflection point is present, adjusting the supply voltage VS according to the information indicated by the supply current IS and/or the supply voltage VS corresponding to the at least one mode inflection point, so as to charge the battery 52 of each corresponding mobile device (e.g., the mobile device 50[1] and the mobile device 50[2]), thus reducing a voltage drop of the mobile charging circuit 51, thereby reducing power loss.

Please refer to FIG. 12A in conjugation with FIG. 3. In an implementation wherein the charging control apparatus 103 includes a battery 11 and the charging control apparatus 103 can measure the supply current IS via a state of charge meter circuit 12, when the charging control apparatus 103 establishes a current versus voltage characteristic curve according to the step S1 and when the charging control apparatus 103 measures the supply current IS via the state of charge meter circuit 12, the battery 11 in the charging control apparatus 103 ceases being charged, so that the current measured by the state of charge meter circuit 12 can accurately reflect the supply current IS.

Please refer to FIG. 12B, which shows a flowchart illustrating an embodiment of how a charging control apparatus controls a switching power converter. This embodiment shown in FIG. 12B is similar to the embodiment shown in FIG. 12A, but is different in that: in this embodiment, subsequent to the step S21, the conversion control circuit 16 is configured to operably control the switching power converter 14 according to the following steps:

Step S3: according to the charging mode combination the mobile device 50[1] and the mobile device 50[2] are in and according to the information indicated by the supply current IS and/or the supply voltage VS corresponding to the at least one mode inflection point, this embodiment adjusts the supply voltage VS, so as to charge the batteries 52 of the mobile devices (i.e., 50[1] and 50[2]), thus reducing the voltage drop of the mobile charging circuits 51, thereby reducing power loss.

Figure 13:
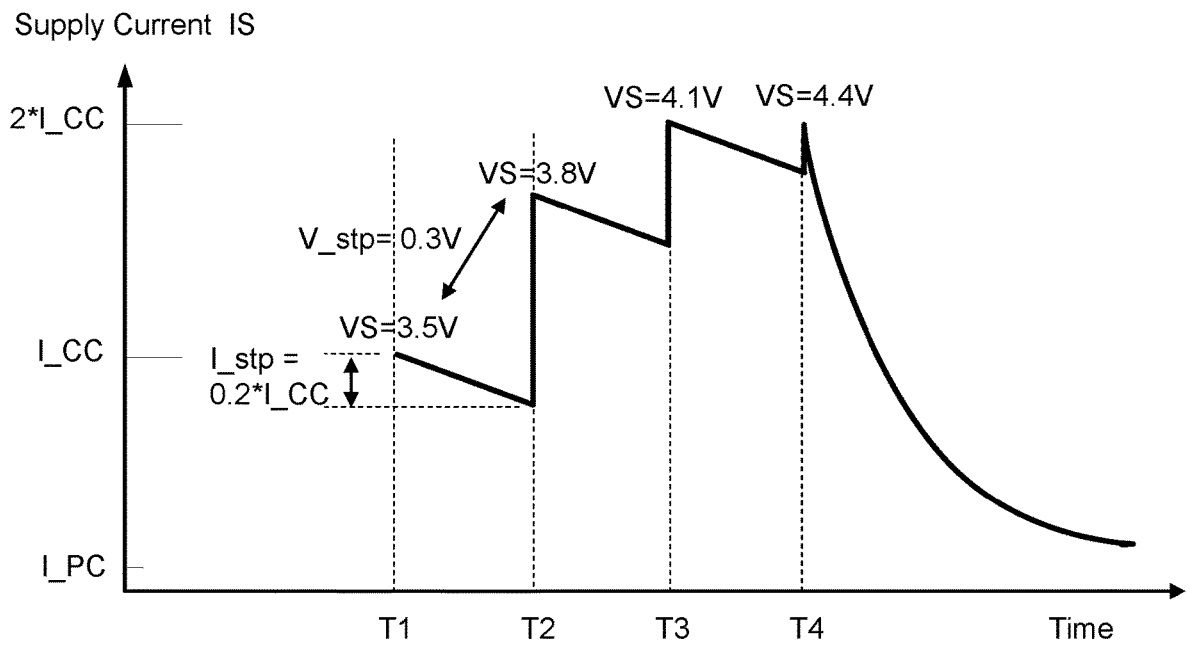
FIG. 13 illustrates a current waveform diagram depicting the operation of a charging control apparatus of the present invention.

Please refer to FIG. 6B along with FIG. 12B and FIG. 13. FIG. 13 illustrates a current waveform diagram depicting the operation of a charging control apparatus of the present invention. To be more specific, FIG. 13 illustrates a current waveform diagram corresponding to the embodiments shown in FIG. 6B and FIG. 12B. In one embodiment, as shown in FIG. 12B, subsequent to the step S3, the conversion control circuit 16 further controls the switching power converter 14 according to the following steps:

Step S4: when sensing the supply current IS and determining that the supply current IS has been decreased by a preset current difference I_stp (i.e., the step S41), this embodiment adjusts the level of the supply voltage VS up by a preset voltage difference V_stp, and continues charging the batteries 52 of the mobile devices (i.e., 50[1] and 50[2]) (i.e., the step S42), wherein the step S41 and the step S42 are repeatedly performed until the charging operation is terminated (i.e., the step S8 to the step S10).

FIG. 13 is taken herein as an example. In the step S3, the level of the supply voltage VS is adjusted to e.g. 3.5V (as shown by the time point T1 in FIG. 13, wherein the time point T1 corresponds to for example the first mode inflection point shown in FIG. 6B), to start charging the batteries 52 of the mobile devices (i.e., 50[1] and 50[2]). At this moment, the supply current IS has a current level of I_CC, and the charge quantities and the voltage level of each batteries 52 of the mobile devices (i.e., 50[1] and/or 50[2]) will increase by time, whereas, the current level of I_CC of the supply current IS (corresponding to the charging current Ich) will decrease by time. This is because the increase of the voltage levels of the batteries 52 of the mobile devices (i.e., 50[1] and/or 50[2]) results in insufficient headroom between the adjusted supply voltage VS (which has an initial voltage level of 3.5V) and the mobile charging circuit 51. Therefore, in response to the occurrence of the above-mentioned phenomenon, in this embodiment, in a case wherein the supply current IS has been decreased by a preset current difference I_stp (e.g., I_stp=0.2*I_CC), the conversion control circuit 16 will control the switching power converter 14 to adjust the level of the supply voltage VS up by a preset voltage difference V_stp (corresponding to the step S4), to continue charging the batteries 52 of the mobile devices (i.e., 50[1] and 50[2]) thereby. As shown in FIG. 13, for example, the preset voltage difference V_stp is 0.3V, and at the time point T2, the voltage level of the supply voltage VS is adjusted to 3.8V, to continue charging the batteries 52 of the mobile devices (i.e., 50[1] and 50[2]) accordingly. Such adjustment operation is repeatedly performed until the voltage level of the supply voltage VS has reaches a voltage level upper limit (e.g., 4.4V, corresponding to the time point T4). As shown in FIG. 13, subsequent to the time point T4, the mobile device (i.e., 50[1] and/or 50[2]) will operate in the CV charging mode (e.g., corresponding to the step S9 shown in FIG. 12B, wherein the step S9 is a final section of the charging operation). Under such circumstance, the current level of the supply current IS (corresponding to the charging current Ich) will decrease by time. When the current level of the supply current IS has been decreased to I_PC, the mobile devices (i.e., 50[1] and/or 50[2]) will stop being charged, and the switching power converter 14 can choose to cease providing the supply power to the mobile device (i.e., 50[1] and/or 50[2]), to save electric power.

It is noteworthy that, in the embodiment shown in FIG. 13, the supply voltage VS is initially set to 3.5V for a primary purpose of power-saving, to reduce the voltage drops of all the mobile charging circuits 51 as much as possible. On the other hand, in other embodiments, the supply voltage VS for example can be initially set to 3.9V corresponding to the second mode inflection point in FIG. 6B (as shown by "VS[2]=3.9V" in FIG. 6B). Under such circumstance, the operation corresponds to a fast-charging power supply mode, which still reduces the voltage drops of all the mobile charging circuits 51 but not as much as in the power saving power supply mode, while enhances the charging speed to reduce the required charging time. The details of the different power supply modes (e.g., the power-saving power supply mode and the fast-charging power supply mode) will be more thoroughly explained later.

It is noteworthy that, the above-mentioned preset current difference I_stp or the above-mentioned preset voltage difference V_stp can be a constant or a variable. The above-mentioned preset current difference I_stp and the above-mentioned preset voltage difference V_stp can be adaptively adjusted according to for example a charging mode where the mobile devices (e.g., 50[1] and/or 50[2]) are in.

Figure 12C:
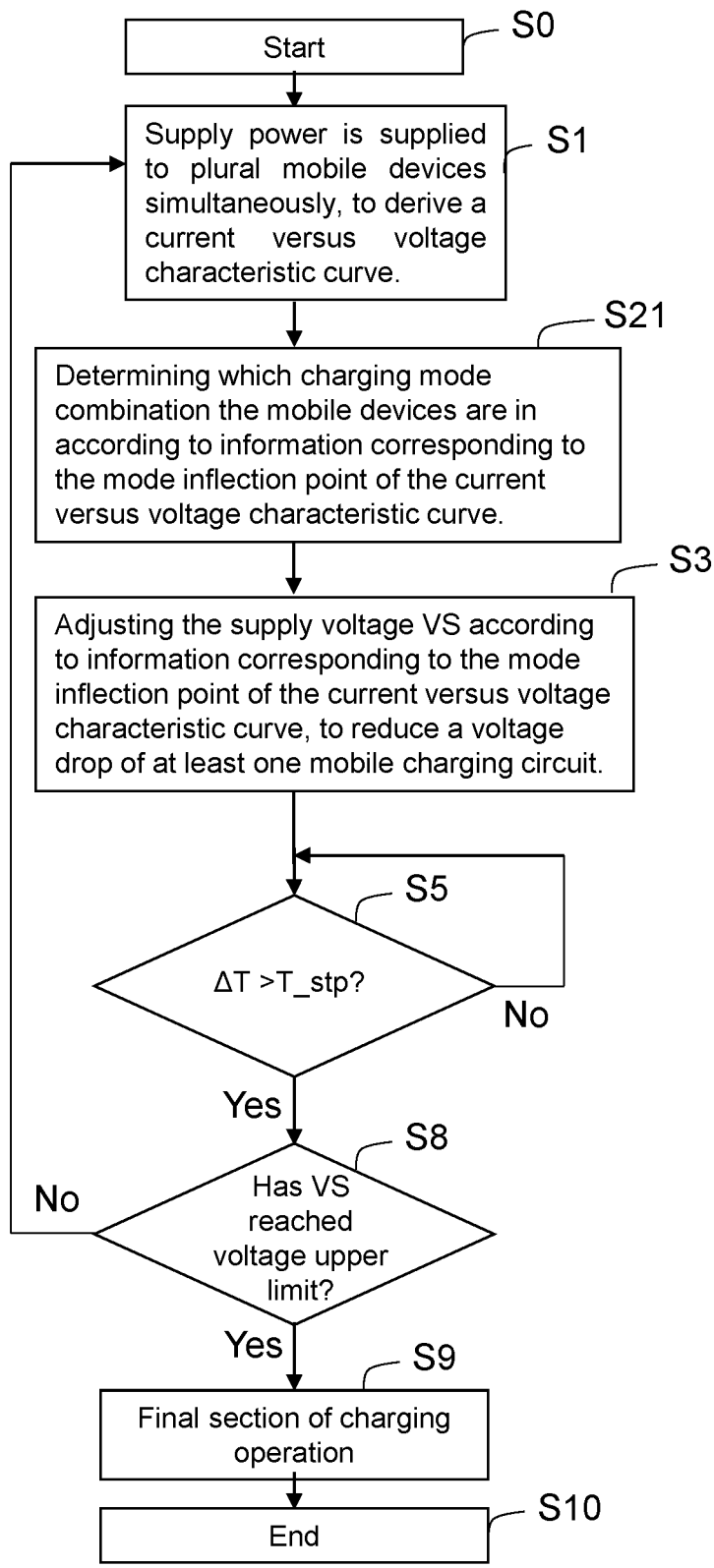

Please refer to FIG. 12C, which shows a flowchart illustrating an embodiment of how a charging control apparatus controls a switching power converter. This embodiment shown in FIG. 12C is similar to the embodiment shown in FIG. 12B, but is different in that: in this embodiment, as shown in FIG. 12C, subsequent to the step S3, the conversion control circuit 16 is configured to operably control the switching power converter 14 further according to the following steps:

Step S5: after a preset charging period T_stp has passed, this embodiment goes back to the step S1, and this operation is repeatedly performed until the charging operation is terminated (the step S8 and the step S10). To elaborate in detail, subsequent to the step S21 and the step S3 whereby the batteries 52 of the mobile devices 50[1] and/or 50[2] have been charged by the adaptively adjusted supply voltage VS for a preset charging period T_stp), this embodiment goes back to the step S1 and executes the step S1 once again, so as to update the current versus voltage characteristic curve corresponding to the supply power, and thereafter the supply voltage VS is adjusted according to this updated current versus voltage characteristic curve; such operation is repeatedly performed until the charging operation is terminated.

It is noteworthy that, the above-mentioned preset charging period T_stp can be a constant or a variable. The above-mentioned preset charging period T_stp can be adaptively adjusted according to for example a charging mode where the mobile devices (e.g., 50[1] and/or 50[2]) are in.

Please refer to FIG. 14A, which shows a further specific embodiment of the step S21 in a flowchart illustrating how a conversion control circuit controls a switching power converter. Please refer to FIG. 14A along with FIG. 11. In this embodiment, the step S21 includes: in the situation where at least one mode inflection point is present, this embodiment compares the information indicated by the supply current IS corresponding to the at least one mode inflection point with a preset precharging (PC) current level I_PC and a preset constant current (CC) current level I_CC, so as to determine which charging mode combination the mobile device 50[1] and the mobile device 50[2] are in. To elaborate in detail, because a mobile device has a specific current level or a specific current level range when the mobile device operates in a specific charging mode, this embodiment can determine which charging mode combination the mobile device 50[1] and the mobile device 50[2] are in, according to a current level of the supply current IS at or subsequent to the mode inflection point, the details of which will be more thoroughly explained later.

Please refer to FIG. 14B, which shows a further specific embodiment of the step S21 in a flowchart illustrating how a conversion control circuit controls a switching power converter. Please refer to FIG. 14B along with FIG. 11. In this embodiment, the step S21 further includes: this embodiment can compare the information indicated by the supply voltage VS corresponding to the at least one mode inflection point of the current versus voltage characteristic curve with a constant voltage (CV) voltage threshold Vthcv and a constant current (CC) voltage threshold Vthcc, so as to determine which charging mode combination the mobile device 50[1] and the mobile device 50[2] are in. To elaborate in detail, because a mobile devices has a specific voltage level or a specific voltage level range when the mobile device operates in a specific charging mode, this embodiment can determine which charging mode combination the mobile device 50[1] and the mobile device 50[2] are in, according to a voltage level of the supply voltage VS at or subsequent to the mode inflection point, the details of which will be more thoroughly explained later.

Please refer to FIG. 14C, which shows a flowchart illustrating a specific embodiment of how a conversion control circuit controls a switching power converter. Please refer to FIG. 14C along with FIG. 11. In the step 21 shown in FIG. 14C, according to a current versus voltage characteristic curve and a table of charging modes shown in FIG. 11, the charging control apparatus of this embodiment can determine which charging mode combination the mobile device 50[1] and the mobile device 50[2] are in according to at least one of following steps:

Step S210: in a case wherein the current versus voltage characteristic curve has no mode inflection point or in a case wherein within the preset voltage range, the corresponding levels of the supply current IS are all lower than the preset PC current level I_PC, it is determined that the mobile device 50[1] and the mobile device 50[2] are in the charging mode combination (0), wherein in the charging mode combination (0), the mobile device 50[1] and the mobile device 50[2] are both in the charging termination mode. And/or, Step S211: in a case wherein the current versus voltage characteristic curve has one and only one mode inflection point and in a case wherein after the supply voltage VS has exceeded the mode inflection point, the corresponding level of the supply current IS is equal to the preset PC current level I_PC, it is determined that the mobile device 50[1] and the mobile device 50[2] are in the charging mode combination (1), wherein in the charging mode combination (1), one of the mobile device 50[1] and the mobile device 50[2] is in the PC mode, whereas, another one of the mobile device 50[1] and the mobile device 50[2] is in the charging termination mode. And/or, Step S212: in a case wherein the current versus voltage characteristic curve has one and only one mode inflection point and in a case wherein after the supply voltage VS has exceeded the mode inflection point, the corresponding level of the supply current IS is greater than the preset PC current level I_PC and smaller than the preset CC current level I_CC, it is determined that the mobile device 50[1] and the mobile device 50[2] are in the charging mode combination (2), wherein in the charging mode combination (2), one of the mobile device 50[1] and the mobile device 50[2] is in the CV charging mode, whereas, another one of the mobile device 50[1] and the mobile device 50[2] is in the charging termination mode. And/or, Step S213: in a case wherein the current versus voltage characteristic curve has one and only one mode inflection point and in a case wherein after the supply voltage VS has exceeded the mode inflection point, the corresponding level of the supply current IS is equal to the preset CC current level I_CC, it is determined that the mobile device 50[1] and the mobile device 50[2] are in the charging mode combination (3), wherein in the charging mode combination (3), one of the mobile device 50[1] and the mobile device 50[2] is in the CC charging mode, whereas, another one of the mobile device 50[1] and the mobile device 50[2] is in the charging termination mode. And/or, Step S214: in a case wherein the current versus voltage characteristic curve has at least one mode inflection point and in a case wherein the level of the supply current IS which corresponds to a greatest one of the supply voltages VS corresponding to the at least one mode inflection point is equal to two-fold of the preset PC current level I_PC, it is determined that the mobile device 50[1] and the mobile device 50[2] are in the charging mode combination (4), wherein in the charging mode combination (4), the mobile device 50[1] and the mobile device 50[2] are both in the PC mode. And/or, Step S215: in a case wherein the current versus voltage characteristic curve has plural inflection points and in a case wherein the level of the supply current IS which corresponds to the greatest one of the supply voltages VS corresponding to the at least one mode inflection point is greater than two-fold of the preset PC current level and smaller than a sum of the preset CC current level I_CC plus the preset PC current level I_PC, it is determined that the mobile device 50[1] and the mobile device 50[2] are in the charging mode combination (5), wherein in the charging mode combination (5), one of the mobile device 50[1] and the mobile device 50[2] is in the CV charging mode, whereas, another one of the mobile device 50[1] and the mobile device 50[2] is in the PC mode. And/or, Step S216: in a case wherein the current versus voltage characteristic curve has the at least one mode inflection point and in a case wherein the level of the supply current IS which corresponds to the greatest one of the supply voltages VS corresponding to the at least one mode inflection point is greater than two-fold of the preset PC current level I_PC and smaller than two-fold of the preset CC current level I_CC, it is determined that the mobile device 50[1] and the mobile device 50[2] are in the charging mode combination (6), wherein in the charging mode combination (6), the mobile device 50[1] and the mobile device 50[2] are both in the CV charging mode. And/or, Step S217: in a case wherein the current versus voltage characteristic curve has the at least one mode inflection point and in a case wherein the level of the supply current IS which corresponds to the greatest one of the supply voltages VS corresponding to the at least one mode inflection point is equal to the sum of the preset CC current level I_CC plus the preset PC current level I_PC, it is determined that the mobile device 50[1] and the mobile device 50[2] are in the charging mode combination (7), wherein in the charging mode combination (7), one of the mobile device 50[1] and the mobile device 50[2] is in the CC charging mode, whereas, another one of the mobile device 50[1] and the mobile device 50[2] is in the PC mode. And/or, Step S218: in a case wherein the current versus voltage characteristic curve has the at least one mode inflection point and in a case wherein the level of the supply current IS which corresponds to the greatest one of the supply voltages VS corresponding to the at least one mode inflection point is greater than the sum of the preset CC current level I_CC plus the preset PC current level I_PC and smaller than two-fold of the preset CC current level I_CC, it is determined that the mobile device 50[1] and the mobile device 50[2] are in the charging mode combination (8), wherein in the charging mode combination (8), one of the mobile device 50[1] and the mobile device 50[2] is in the CC charging mode, whereas, another one of the mobile device 50[1] and the mobile device 50[2] is in the CV charging mode. And/or, Step S219: in a case wherein the current versus voltage characteristic curve has the at least one mode inflection point and in a case wherein the level of the supply current IS which corresponds to the greatest one of the supply voltages VS corresponding to the at least one mode inflection point is equal to two-fold of the preset CC current level I_CC, it is determined that the mobile device 50[1] and the mobile device 50[2] are in the charging mode combination (9), wherein in the charging mode combination (9), the mobile device 50[1] and the mobile device 50[2] are both in the CC charging mode.

It is noteworthy that, the above-mentioned term "two-fold of the preset CC current level I_CC" as described in the step S216, the step S218 and the step S219 can be understood as a sum of all the preset CC current levels I_CC of the mobile device 50[1] and the mobile device 50[2]. The preset CC current levels I_CC of the mobile device 50[1] and the mobile device 50[2] can be the same as or different from one another. Besides, it is noteworthy that, the above-mentioned term "two-fold of the preset PC current level I_PC" as described in the step S214 and the step S216 can be understood as a sum of all the preset PC current levels I_PC of the mobile device 50[1] and the mobile device 50[2]. The preset PC current levels I_PC of the mobile device 50[1] and the mobile device 50[2] can be the same as or different from one another.

Please still refer to FIG. 14C along with FIG. 11. In one embodiment, the step S212 further includes: only when the information indicated by the supply voltage VS corresponding to the at least one mode inflection point is greater than or equal to the CV voltage threshold Vthcv, it is then determined that the mobile device 50[1] and the mobile device 50[2] are in the charging mode combination (2).

In one embodiment, the step S215 further includes: only when the information indicated by the greatest one of the supply voltages VS corresponding to the mode inflection points is greater than or equal to the CV voltage threshold Vthcv and when the information indicated by the smallest one of the supply voltages VS corresponding to the mode inflection points is smaller than the CC voltage threshold Vthcc, it is then determined that the mobile device 50[1] and the mobile device 50[2] are in the charging mode combination (5).

In one embodiment, the step S216 further includes: only when the information indicated by the supply voltages VS corresponding to the at least one mode inflection point are all greater than or equal to the CV voltage threshold Vthcv, it is then determined that the mobile device 50[1] and the mobile device 50[2] are in the charging mode combination (6).

In one embodiment, the step S218 further includes: the step S218 further includes: only when the information indicated by the greatest one of the supply voltages VS corresponding to the at least one mode inflection point is greater than the CV voltage threshold Vthcv and when the information indicated by the smallest one of the supply voltages VS corresponding to the at least one mode inflection point is smaller than the CV voltage threshold Vthcv and is greater than or equal to the CC voltage threshold Vthcc, it is then determined that the mobile device 50[1] and the mobile device 50[2] are in the charging mode combination (8).

It is noteworthy that, in one embodiment, when the charging control apparatus determines that the mobile devices are in the charging mode combination (0) (i.e., all the mobile devices are in the charging termination mode), the charging control apparatus can cease providing the supply power to the mobile devices, to save electric power.

Figure 15:
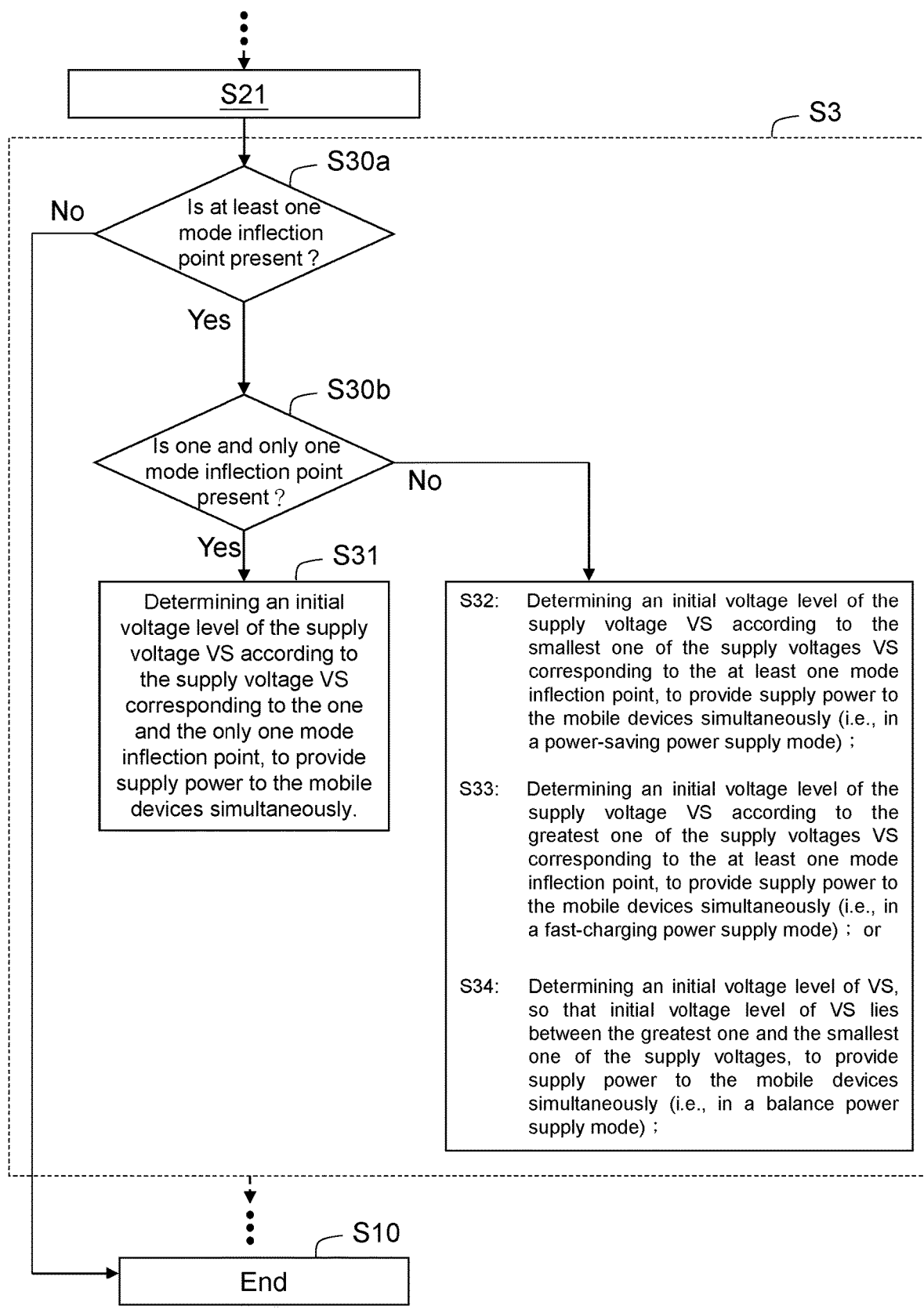
FIG. 15 shows a flowchart illustrating a specific embodiment of how a charging control apparatus controls a switching power converter, so as to charge a mobile device.

Please refer to FIG. 15, which shows a flowchart illustrating a specific embodiment of how a charging control apparatus controls a switching power converter, so as to charge a mobile device. Ina case wherein the step S21 is present, according to the charging mode combination where the mobile device 50[1] and the mobile device 50[2] are in, the conversion control circuit 16 can control the switching power converter 14 to adjust the supply voltage VS, so as to charge the batteries 52 of the mobile devices (i.e., 50[1] and 50[2]) by an optimum voltage, thus reducing the voltage drops of the mobile charging circuits 51, thereby reducing power loss.

To elaborate in more detail, as shown in FIG. 15, in one embodiment, the step S3 includes one of the following steps:

Step S31: in a case wherein the mobile device 50[1] and the mobile device 50[2] are determined via the above-mentioned mode determination step 21 to be in the charging mode combination (1), the charging mode combination (2) or the charging mode combination (3) (i.e., in a case wherein the current versus voltage characteristic curve has one and only one mode inflection point), according to the supply voltage VS corresponding to the one and the only one mode inflection point, this embodiment can determine an initial voltage level of the supply voltage VS, to provide supply power to plural mobile device (i.e., 50[1] and 50[2]) to charge the batteries 52 of the mobile devices (i.e., 50[1] and 50[2]) simultaneously, thus enhancing charging speed and reducing the voltage drops of the mobile charging circuits 51, thereby reducing power loss.

In one embodiment, in a case wherein the current versus voltage characteristic curve has plural mode inflection points, the charging control apparatus (i.e., charging control apparatus 102 and/or charging control apparatus 103) of the present invention can determine the distribution and arrangement of the supply power according to a power supply mode which is for example preset by a user or determined according to the conditions of the entire system in concern. To elaborate in more detail, as shown in FIG. 15, in one embodiment, the step S3 includes one of the following steps:

Step S32: in a case wherein the mobile device 50[1] and the mobile device 50[2] are in the charging mode combination (4) to (9) (i.e., in a case wherein the current versus voltage characteristic curve has plural mode inflection points), in a power-saving power supply mode, according to the smallest one of the supply voltages VS corresponding to the at least one mode inflection point, this embodiment can determine the level of the supply voltage VS to charge the batteries 52 of the mobile devices (i.e., 50[1] and 50[2]), thus reducing the voltage drops of the mobile charging circuits 51, thereby reducing power loss. Or, Step S33: in a case wherein the mobile device 50[1] and the mobile device 50[2] are in the charging mode combination (4) to (9), in a fast-charging power supply mode, according to the greatest one of the supply voltages VS corresponding to the at least one mode inflection point, this embodiment can determine the level of the supply voltage VS to charge the batteries 52 of the mobile devices (i.e., 50[1] and 50[2]), thus enhancing charging speed and reducing the voltage drops of the mobile charging circuits 51, thereby reducing power loss. Or, Step S34: in a case wherein the mobile device 50[1] and the mobile device 50[2] are in the charging mode combination (4) to (9), in a balance power supply mode, this embodiment can adjust the level of the supply voltage VS, so that the adjusted level of the supply voltage VS lies between the greatest one of the supply voltages VS corresponding to the at least one mode inflection point and the smallest one of the supply voltages VS corresponding to the at least one mode inflection point, thus charging the batteries 52 of the mobile devices (i.e., 50[1] and 50[2]), thereby balancing charging speed and power loss.

It is noteworthy that, in a case wherein the mobile device 50[1] and the mobile device 50[2] are in the charging mode combination (4) to (9) (i.e., in a case wherein the current versus voltage characteristic curve has plural mode inflection points), in one embodiment, the voltage levels of the supply voltages VS corresponding to the plural mode inflection points are clearly different from one another, so it can be clearly determined that the current versus voltage characteristic curve has plural mode inflection points. However, in other embodiments, although the current versus voltage characteristic curve has plural mode inflection points, the voltage levels of the supply voltages VS corresponding to the plural mode inflection points may overlap or coincide with one another, and in this case it cannot not be straightforwardly determined that the current versus voltage characteristic curve has plural mode inflection points according to the appearance of the current versus voltage characteristic curve. Although given this factual obstacle, as long as the mobile device 50[1] and the mobile device 50[2] are in the charging mode combination (4) to (9), it can be regarded as that the current versus voltage characteristic curve has plural mode inflection points.

Besides, as shown in FIG. 15, in one embodiment, prior to the steps S31 to S34, the step S3 can further includes: a step S30a and a step S30b. In the step S30a, this embodiment can determine whether the current versus voltage characteristic curve has at least one mode inflection point. When this embodiment determines that the current versus voltage characteristic curve does not have any mode inflection point (corresponding to the charging mode combination (0)), the switching power converter 14 can for example cease providing the supply power to the mobile devices (i.e., 50[1] and/or 50[2]) (corresponding to the step S10, "End"). In the step S30b, this embodiment can determine whether the current versus voltage characteristic curve has one and only one mode inflection point (corresponding to the charging mode combination (1) to (3)). When this embodiment determines that the current versus voltage characteristic curve have more than one mode inflection point, this embodiment determines that the mobile devices (i.e., 50[1] and/or 50[2]) are in the charging mode combination (4) to (9).

Figure 16A:
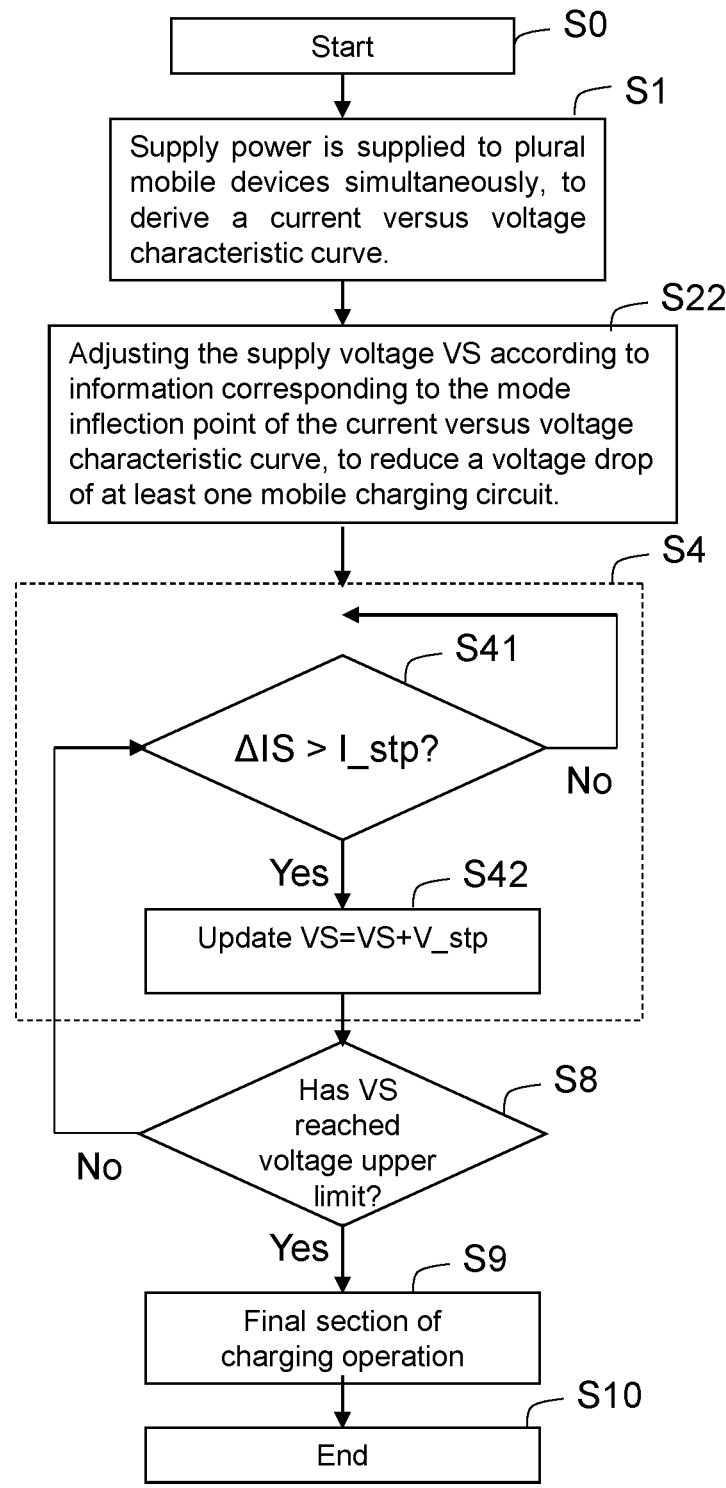
FIG. 16A and FIG. 16B respectively show flowcharts illustrating two specific embodiments of how a charging control apparatus controls a switching power converter, so as to charge a mobile device.
Figure 16B:
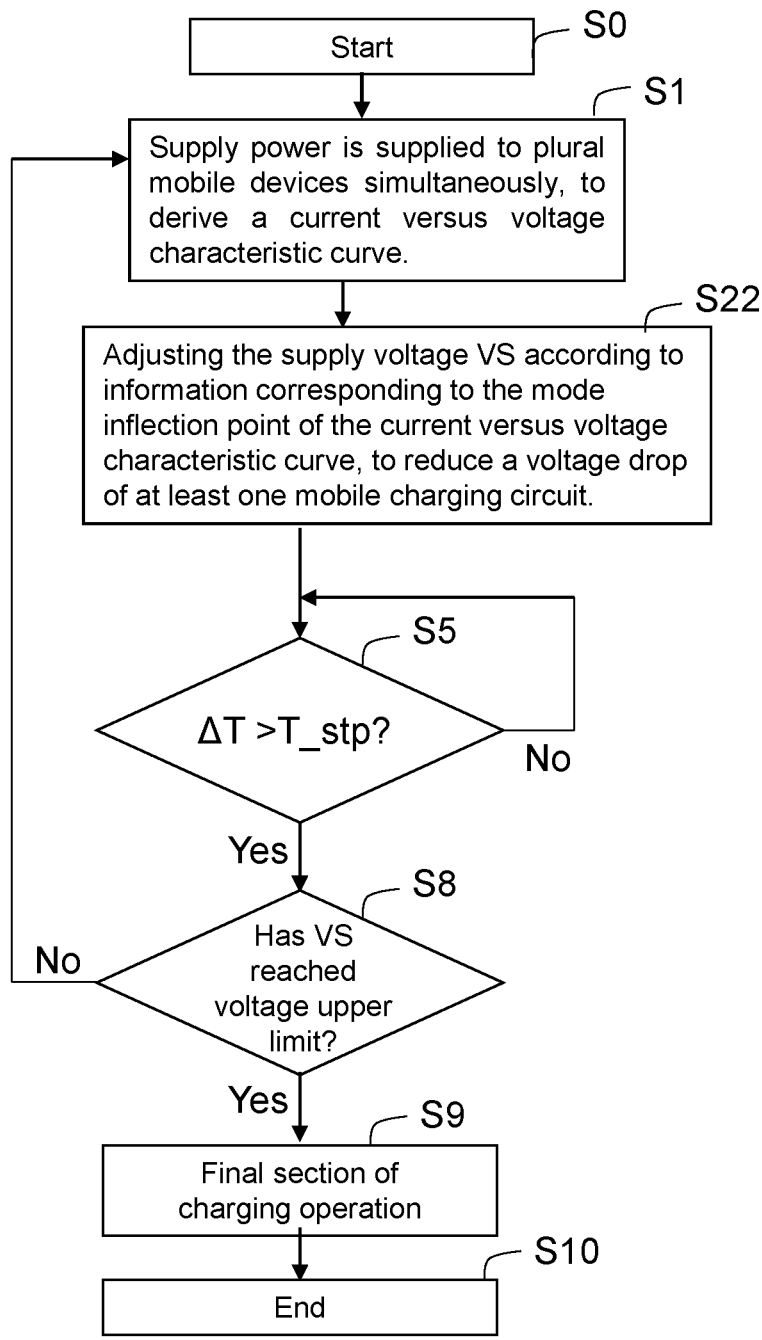

Please refer to FIG. 16A and FIG. 16B, which respectively show flowcharts illustrating two specific embodiments of how a charging control apparatus controls a switching power converter, so as to charge a mobile device. The embodiments shown in FIG. 16A and FIG. 16B are similar to the embodiments shown in FIG. 12A to FIG. 12C, but are different in that: in these embodiments, the step S21 (i.e., a mode determination step) in FIG. 12A to FIG. 12C are omitted from the embodiments shown in FIG. 16A and FIG. 16B. Thus, unlike the embodiments shown in FIG. 12A to FIG. 12C, the embodiments shown in FIG. 16A and FIG. 16B directly execute the step S22 (in the absence of the step S21) to adjust the supply voltage VS according to whether the current versus voltage characteristic curve has at least one mode inflection point and according to the information indicated by the supply current IS and/or the supply voltage VS corresponding to the at least one mode inflection point in a situation where the at least one mode inflection point is present. The thus adjusted supply voltage VS is adopted to charge the batteries 52 of the mobile devices (i.e., 50[1] and 50[2]).

As shown in FIG. 16A and FIG. 16B, in these embodiments, subsequent to the step S22, the conversion control circuit 16 is configured to operably control the switching power converter 14 according to the step S4 (as shown in FIG. 16A) or the step S5 (as shown in FIG. 16B). The step S4 shown in FIG. 16A and the step S5 shown in FIG. 16B operate in the same way as the step S4 shown in FIG. 12B and the step S5 shown in FIG. 12C as previously described, so the details thereof are not redundantly repeated here.

Figure 17:
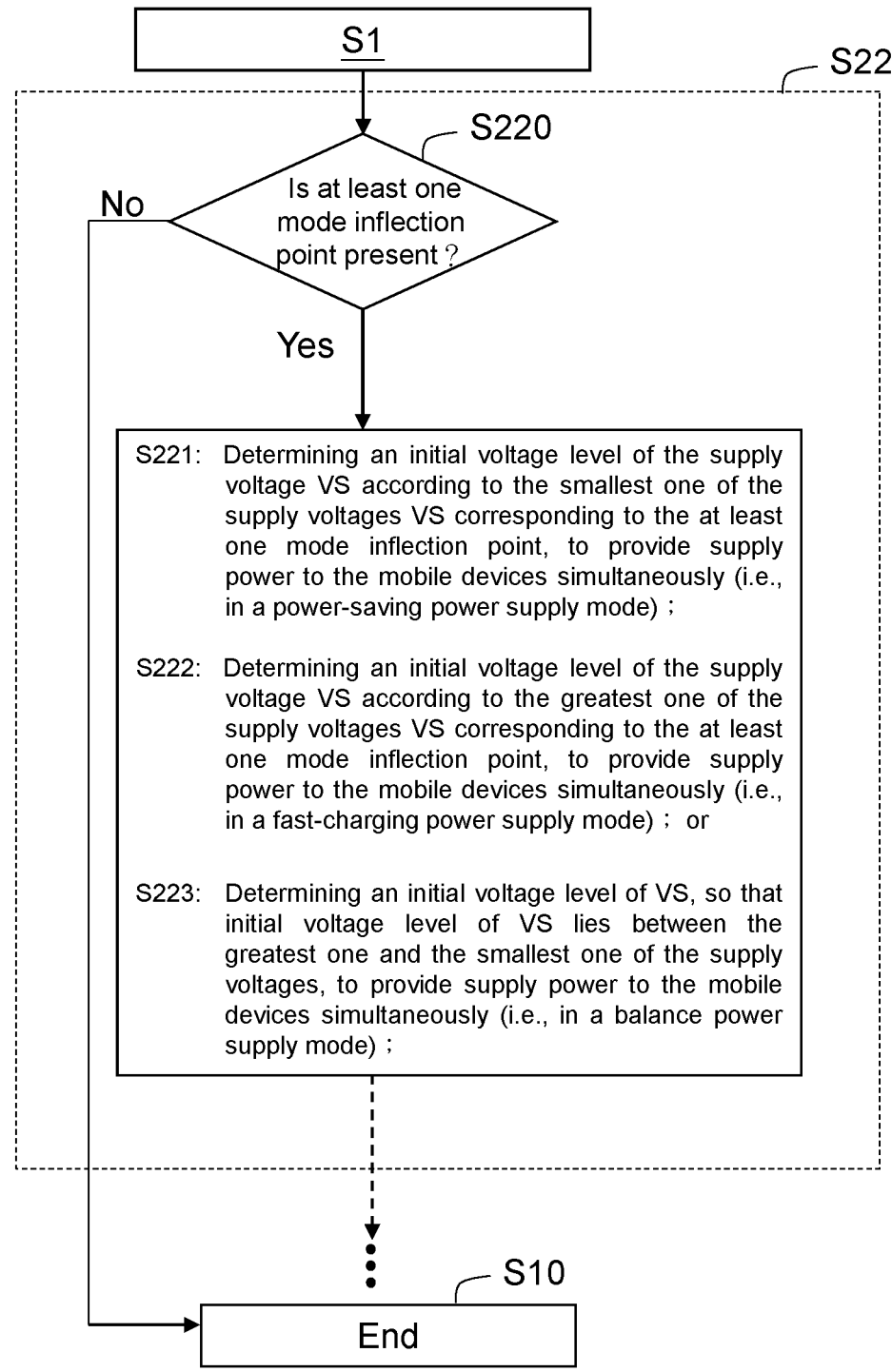
FIG. 17 shows a flowchart a further specific embodiment of illustrating how a charging control apparatus controls a switching power converter, so as to charge a mobile device.

Please refer to FIG. 17, which shows a flowchart illustrating a further specific embodiment of how a charging control apparatus controls a switching power converter, so as to charge a mobile device. In the situation where at least one mode inflection point is present, the conversion control circuit 16 is configured to operably decide the supply voltage VS according to the information indicated by the supply current IS and/or the supply voltage VS corresponding to the at least one mode inflection point, so that the thus decided supply voltage VS charges the batteries 52 of the mobile devices (i.e., 50[1] and 50[2]), thus reducing the voltage drop of the mobile charging circuit 51, thereby reducing power loss.

To elaborate in more detail, as shown in FIG. 17, in one embodiment, the step S22 includes one of the following steps:

Step S221: in a power-saving power supply mode, this embodiment can determine the level of the supply voltage VS according to the smallest one of the supply voltages VS corresponding to the at least one mode inflection point, so as to charge the batteries 52 of the mobile devices (i.e., 50[1]

and 50[2]) accordingly, thus reducing the voltage drop of the mobile charging circuit 51, thereby reducing power loss.

Step S222: in a fast-charging power supply mode, this embodiment can determine the level of the supply voltage VS according to the greatest one of the supply voltages VS corresponding to the at least one mode inflection point, so as to charge the batteries 52 of the mobile devices (i.e., 50[1] and 50[2]) accordingly, thus enhancing charging speed and reducing the voltage drop of the mobile charging circuit 51, thereby reducing power loss; or Step S223: in a balance power supply mode, this embodiment can adjust the level of the supply voltage VS, so that the adjusted level of the supply voltage VS lies between the greatest one of the supply voltages VS corresponding to the at least one mode inflection point and the smallest one of the supply voltages VS corresponding to the at least one mode inflection point, and charge the batteries 52 of the mobile devices (i.e., 50[1] and 50[2]) by the supply voltage VS, thereby balancing charging speed and power loss.

It is noteworthy that, in the step S221 to the step S223, in a case wherein the current versus voltage characteristic curve has one and only one mode inflection point or in a case wherein the corresponding supply voltages VS coincide with each other, "the greatest one" or "the smallest one" is the only one voltage level of the supply voltages VS.

In one embodiment, as shown in FIG. 17, prior to the step S221 to the step S223, in one embodiment, the step S22 can further include a step S220. In the step S220, it is determined whether the current versus voltage characteristic curve has at least one mode inflection point. When the step S220 determines that the current versus voltage characteristic curve has no mode inflection point (corresponding to the charging mode combination (0)). Under such circumstance, the switching power converter 14 can for example cease providing the supply power (corresponding to the step S10 shown in FIG. 17, i.e., "End").

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. For another example, it should be understood that the implementation of the above-mentioned embodiments as having two mobile devices is only an illustrative example, but not for limiting the scope of the present invention. Within the teaching of the present invention, those skilled in this art can readily conceive that it is also practicable and within the scope of the present invention that three or more mobile devices can be adopted. Under such implementation, there will be three or more corresponding mode inflection points. Besides, note that plural mobile devices can have different features. To be more specific, different mobile devices can operate in different charging modes. Or, when operating in a precharging (PC) mode, a constant current (CC) charging mode or a constant voltage (CV) charging mode, different mobile devices may have different corresponding current levels and voltage levels corresponding to the above-mentioned different charging modes. As long as these preset information can be obtained in advance, the mode determination and supply voltage determination according to the present invention can be performed to achieve the above-mentioned efficacy of power saving. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A charging control apparatus, which is configured to operably provide a supply power to at least a first mobile device and a second mobile device, wherein each of the first and the second mobile device includes: a mobile charging circuit and a first battery, wherein each mobile charging circuit is configured to operably convert the supply power to a charging power for charging the corresponding first battery, wherein the mobile charging circuit is operable in at least two of the following charging modes: a precharging (PC) mode, a constant current (CC) charging mode and a constant voltage (CV) charging mode, so as to charge the corresponding first battery; the charging control apparatus comprising:

a switching power converter, which is configured to operably convert an input power to the supply power, wherein the supply power has a supply voltage and a supply current; and a conversion control circuit, which is configured to operably control the switching power converter;

wherein the conversion control circuit is configured to operably control the switching power converter according to the following steps:

step S1: controlling the switching power converter to gradually adjust a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present:

step S21: determining a charging mode combination where the first mobile device and the second mobile device are in; or step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

2. The charging control apparatus of claim 1, wherein the step S21 includes: in the situation where the at least one mode inflection point is present, comparing the information indicated by the supply current corresponding to the at least one mode inflection point with a preset precharging (PC) current level and a preset constant current (CC) current level, so as to determine the charging mode combination where the first mobile device and the second mobile device are in.

3. The charging control apparatus of claim 1, wherein the step S21 includes:
comparing the information indicated by the supply voltage corresponding to the at least one mode inflection point of the current versus voltage characteristic curve with a constant voltage (CV) voltage threshold and a CC voltage threshold, so as to determine the charging mode combination where the first mobile device and the second mobile device are in.

4. The charging control apparatus of claim 1, wherein in the step S21, the conversion control circuit is configured to operably determine which charging mode combination the first mobile device and the second mobile device are in according to the current versus voltage characteristic curve by at least one of following steps:
step S210: in a case wherein the current versus voltage characteristic curve has no mode inflection point, or, in a case wherein within the preset voltage range, the corresponding levels of the supply current are all lower than the preset PC current level, determining that the first mobile device and the second mobile device are in a charging mode combination (0), wherein in the charging mode combination (0), the first mobile device and the second mobile device are both in a charging termination mode;
step S211: in a case wherein the current versus voltage characteristic curve has one and only one mode inflection point and in a case wherein after the supply voltage has exceeded the mode inflection point, the corresponding level of the supply current is equal to the preset PC current level, determining that the first mobile device and the second mobile device are in a charging mode combination (1), wherein in the charging mode combination (1), one of the first mobile device and the second mobile device is in the PC mode, whereas, another one of the first mobile device and the second mobile device is in the charging termination mode;
step S212: in a case wherein the current versus voltage characteristic curve has one and only one mode inflection point and in a case wherein after the supply voltage has exceeded the mode inflection point, the corresponding level of the supply current is greater than the preset PC current level and smaller than the preset CC current level, determining that the first mobile device and the second mobile device are in a charging mode combination (2), wherein in the charging mode combination (2), one of the first mobile device and the second mobile device is in the CV charging mode, whereas, another one of the first mobile device and the second mobile device is in the charging termination mode;
step S213: in a case wherein the current versus voltage characteristic curve has one and only one mode inflection point and in a case wherein after the supply voltage has exceeded the mode inflection point, the corresponding level of the supply current is equal to the preset CC current level, determining that the first mobile device and the second mobile device are in a charging mode combination (3), wherein in the charging mode combination (3), one of the first mobile device and the second mobile device is in the CC charging mode, whereas, another one of the first mobile device and the second mobile device is in the charging termination mode;
step S214: in a case wherein the current versus voltage characteristic curve has at least one mode inflection point and in a case wherein the corresponding level of the supply current which corresponds to a greatest one of the supply voltages corresponding to the at least one mode inflection point is equal to two-fold of the preset PC current level, determining that the first mobile device and the second mobile device are in a charging mode combination (4), wherein in the charging mode combination (4), the first mobile device and the second mobile device are both in the PC mode;
step S215: in a case wherein the current versus voltage characteristic curve has a plurality of inflection points and in a case wherein the corresponding level of the supply current which corresponds to the greatest one of the supply voltages corresponding to the at least one mode inflection point is greater than two-fold of the preset PC current level and smaller than a sum of the preset CC current level plus the preset PC current level, determining that the first mobile device and the second mobile device are in a charging mode combination (5), wherein in the charging mode combination (5), one of the first mobile device and the second mobile device is in the CV charging mode, whereas, another one of the first mobile device and the second mobile device is in the PC mode;
step S216: in a case wherein the current versus voltage characteristic curve has the at least one mode inflection point and in a case wherein the corresponding level of the supply current which corresponds to the greatest one of the supply voltages corresponding to the at least one mode inflection point is greater than two-fold of the preset PC current level and smaller than two-fold of the preset CC current level, determining that the first mobile device and the second mobile device are in a charging mode combination (6), wherein in the charging mode combination (6), the first mobile device and the second mobile device are both in the CV charging mode;
step S217: in a case wherein the current versus voltage characteristic curve has the at least one mode inflection point and in a case wherein the corresponding level of the supply current which corresponds to the greatest one of the supply voltages corresponding to the at least one mode inflection point is equal to the sum of the preset CC current level plus the preset PC current level, determining that the first mobile device and the second mobile device are in a charging mode combination (7), wherein in the charging mode combination (7), one of the first mobile device and the second mobile device is in the CC charging mode, whereas, another one of the first mobile device and the second mobile device is in the PC mode;
step S218: in a case wherein the current versus voltage characteristic curve has the at least one mode inflection point and in a case wherein the corresponding level of the supply current which corresponds to the greatest one of the supply voltages corresponding to the at least one mode inflection point is greater than the sum of the preset CC current level plus the preset PC current level and smaller than two-fold of the preset CC current level, determining that the first mobile device and the second mobile device are in a charging mode combination (8), wherein in the charging mode combination (8), one of the first mobile device and the second mobile device is in the CC charging mode, whereas, another one of the first mobile device and the second mobile device is in the CV charging mode; and/or step S219: in a case wherein the current versus voltage characteristic curve has the at least one mode inflection point and in a case wherein the corresponding level of the supply current which corresponds to the greatest one of the supply voltages corresponding to the at least one mode inflection point is equal to two-fold of the preset CC current level, determining that the first mobile device and the second mobile device are in a charging mode combination (9), wherein in the charging mode combination (9), the first mobile device and the second mobile device are both in the CC charging mode.

5. The charging control apparatus of claim 4, wherein in a case wherein the charging control apparatus is configured to operably determine the charging mode combination where the first mobile device and the second mobile device are in according to at least one of the step S212, the step S215, the step S216 or the step S218, each of the step S212, the step S215, the step S216 and the step S218 further includes a corresponding operation as the following:

the step S212 further including: only when the information indicated by the supply voltage corresponding to the at least one mode inflection point is greater than or equal to the CV voltage threshold, then determining that the first mobile device and the second mobile device are in the charging mode combination (2);

the step S215 further including: only when the information indicated by the greatest one of the supply voltages corresponding to the mode inflection points is greater than or equal to the CV voltage threshold and when the information indicated by the smallest of voltages one the supply corresponding to the mode inflection points is smaller than the CC voltage threshold, then determining that the first mobile device and the second mobile device are in the charging mode combination (5);

the step S216 further including: only when the information indicated by the supply voltages corresponding to the at least one mode inflection point are all greater than or equal to the CV voltage threshold, then determining that the first mobile device and the second mobile device are in the charging mode combination (6); and/or the step S218 further including: only when the information indicated by the greatest one of the supply voltages corresponding to the at least one mode inflection point is greater than the CV voltage threshold and when the information indicated by the smallest one of the supply voltages corresponding to the at least one mode inflection point is smaller than the CV voltage threshold and is greater than or equal to the CC voltage threshold, then determining that the first mobile device and the second mobile device are in the charging mode combination (8).

6. The charging control apparatus of claim 5, wherein in a case wherein the step S21 is present, the conversion control circuit is configured to operably control the switching power converter further according to the following step:

step S3: according to the charging mode combination where the first mobile device and the second mobile device are in and according to the information indicated by the supply current and/or the supply voltage corresponding to the at least one mode inflection point, adjusting the supply voltage to charge the first battery of the corresponding mobile device, so as to reduce the voltage drop of each mobile charging circuit.

7. The charging control apparatus of claim 6, wherein the step S3 includes the following step:

step S31: in a case wherein the first mobile device and the second mobile device are in the charging mode combination (1), the charging mode combination (2) or the charging mode combination (3), according to the supply voltage corresponding to the one and the only one mode inflection point, determining the level of the supply voltage to charge the first battery of the corresponding mobile device, so as to enhance charging speed and reduce the voltage drop of each mobile charging circuit.

8. The charging control apparatus of claim 6, wherein the step S3 includes one of the following steps:

step S32: in a case wherein the first mobile device and the second mobile device are in the charging mode combination (4) to (9), in a power-saving power supply mode, according to the smallest one of the supply voltages corresponding to the at least one mode inflection point, determining the level of the supply voltage to charge the first battery of the corresponding mobile device, thus reducing the voltage drop of each mobile charging circuit;

step S33: in a case wherein the first mobile device and the second mobile device are in the charging mode combination (4) to (9), in a fast-charging power supply mode, according to the greatest one of the supply voltages corresponding to the at least one mode inflection point, determining the level of the supply voltage, so as to charge the first battery of the corresponding mobile device, thus enhancing charging speed and reducing the voltage drop of each mobile charging circuit; or step S34: in a case wherein the first mobile device and the second mobile device are in the charging mode combination (4) to (9), in a balance power supply mode, adjusting the level of the supply voltage, so that the adjusted level of the supply voltage lies between the greatest of one supply voltages corresponding to the at least one mode inflection point and the smallest one f the supply voltages corresponding to the at least one mode inflection point, thus charging the first battery of the corresponding mobile device, thereby balancing charging speed and power loss.

9. The charging control apparatus of claim 6, wherein subsequent to the step S3, the conversion control circuit is configured to operably control the switching power converter further according to the following step:

step s4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

10. The charging control apparatus of claim 6, wherein subsequent to the step S3, the conversion control circuit is configured to operably control the switching power converter further according to the following step:

step S5: after a preset charging period has passed, proceeding back to the step S1, and repeating the steps S1-S3 and S5 until the charging to the first batteries is terminated.

11. The charging control apparatus of claim 1, wherein the step S22 includes one of the following steps:

step S221: in a power-saving power supply mode, determining the level of the supply voltage according to the smallest one of the supply voltages corresponding to the at least one mode inflection point, so as to charge the first battery of the corresponding mobile device, thus reducing the voltage drop of each mobile charging circuit;

step S222: in a fast-charging power supply mode, determining the level of the supply voltage according to the greatest one of the supply voltages corresponding to the at least one mode inflection point, so as to charge the first battery of the corresponding mobile device, thus enhancing charging speed and reducing the voltage drop of each mobile charging circuit; or step S223: in a balance power supply mode, adjusting the level of the supply voltage, so that the adjusted level of the supply voltage lies between the greatest one of the supply voltages corresponding to the at least one mode inflection point and the smallest one of the supply voltages corresponding to the at least one mode inflection point, thus charging the first battery of the corresponding mobile device, thereby balancing charging speed and power loss.

12. The charging control apparatus of claim 1, wherein subsequent to the step S22, the conversion control circuit is configured to operably control the switching power converter further according to the following step:

step S4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

13. The charging control apparatus of claim 1, wherein subsequent to the step S22, the conversion control circuit is configured to operably control the switching power converter further according to the following step:

step S5: after a preset charging period has passed, proceeding back to the step S1.

14. The charging control apparatus of claim 1, further comprising:

a state of charge meter coupled to the conversion control circuit and a second battery configured to operably provide an input power, wherein the state of charge meter is configured to operably sense a current of the second battery during charging/discharging of the second battery, so as to record charge quantities of the second battery, wherein in a situation where the second battery is configured to operably provide the supply power to the first mobile device and the second mobile device, the current of the second battery is substantially equal to the supply current.

15. The charging control apparatus of claim 14, further comprising the second battery.

16. The charging control apparatus of claim 14, wherein when the step S1 is being executed, the second battery ceases being charged.

17. The charging control apparatus of claim 14, wherein the mobile charging circuit is configured as a linear charging circuit.

18. The charging control apparatus of claim 14, wherein when determining that the first mobile device and the second mobile device are in the charging mode combination (0), the charging control apparatus ceases providing the supply power.

19. A charging control method, which is configured to operably provide a supply power to a first mobile device and a second mobile device, wherein each of the first and the second mobile device includes: a mobile charging circuit and first battery, wherein each mobile charging circuit is configured to operably convert the supply power to a charging power for charging the corresponding first battery, wherein the mobile charging circuit is operable in at least two charging modes of a precharging (PC) mode, a constant current (CC) charging mode and a constant voltage (CV) charging mode, so as to charge the corresponding first battery; wherein the supply power has a supply voltage and a supply current; the charging control method comprising:

step S1: gradually adjusting a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present:

step S21: determining a charging mode combination where the first mobile device and the second mobile device are in; or step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

20. The charging control method of claim 19, wherein the step S21 includes: in the situation where the at least one mode inflection point is present, comparing the information indicated by the supply current corresponding to the at least one mode inflection point with a preset precharging (PC) current level and a preset constant current (CC) current level, so as to determine the charging mode combination where the first mobile device and the second mobile device are in.

21. The charging control method of claim 19, wherein the step S21 includes:

comparing the information indicated by the supply voltage corresponding to the at least one mode inflection point of the current versus voltage characteristic curve with a constant voltage (CV) voltage threshold and a CC voltage threshold, so as to determine the charging mode combination where the first mobile device and the second mobile device are in.

22. The charging control method of claim 19, wherein the step S21 of determining the charging mode combination where the first mobile device and the second mobile device are in according to the current versus voltage characteristic curve includes at least one of following steps:

step S210: in a case wherein the current versus voltage characteristic curve has no mode inflection point, or, in a case wherein within the preset voltage range, the corresponding levels of the supply current are all lower than the preset PC current level, determining that the first mobile device and the second mobile device are in a charging mode combination (0), wherein in the charging mode combination (0), the first mobile device and the second mobile device are both in a charging termination mode;

step S211: in a case wherein the current versus voltage characteristic curve has one and only one mode inflection point and in a case wherein after the supply voltage has exceeded the mode inflection point, the corresponding level of the supply current is equal to the preset PC current level, determining that the first mobile device and the second mobile device are in a charging mode combination (1), wherein in the charging mode combination (1), one of the first mobile device and the second mobile device is in the PC mode, whereas, another one of the first mobile device and the second mobile device is in the charging termination mode;

step S212: in a case wherein the current versus voltage characteristic curve has one and only one mode inflection point and in a case wherein after the supply voltage has exceeded the mode inflection point, the corresponding level of the supply current is greater than the preset PC current level and smaller than the preset CC current level, determining that the first mobile device and the second mobile device are in a charging mode combination (2), wherein in the charging mode combination (2), one of the first mobile device and the second mobile device is in the CV charging mode, whereas, another one of the first mobile device and the second mobile device is in the charging termination mode;

step S213: in a case wherein the current versus voltage characteristic curve has one and only one mode inflection point and in a case wherein after the supply voltage has exceeded the mode inflection point, the corresponding level of the supply current is equal to the preset CC current level, determining that the first mobile device and the second mobile device are in a charging mode combination (3), wherein in the charging mode combination (3), one of the first mobile device and the second mobile device is in the CC charging mode, whereas, another one of the first mobile device and the second mobile device is in the charging termination mode;

step S214: in a case wherein the current versus voltage characteristic curve has at least one mode inflection point and in a case wherein the corresponding level of the supply current which corresponds to a greatest one of the supply voltages corresponding to the at least one mode inflection point is equal to two-fold of the preset PC current level, determining that the first mobile device and the second mobile device are in a charging mode combination (4), wherein in the charging mode combination (4), the first mobile device and the second mobile device are both in the PC mode;

step S215: in a case wherein the current versus voltage characteristic curve has a plurality of inflection points and in a case wherein the corresponding level of the supply current which corresponds to the greatest one of the supply voltages corresponding to the at least one mode inflection point is greater than two-fold of the preset PC current level and smaller than a sum of the preset CC current level plus the preset PC current level, determining that the first mobile device and the second mobile device are in a charging mode combination (5), wherein in the charging mode combination (5), one of the first mobile device and the second mobile device is in the CV charging mode, whereas, another one of the first mobile device and the second mobile device is in the PC mode;

step S216: in a case wherein the current versus voltage characteristic curve has the at least one mode inflection point and in a case wherein the corresponding level of the supply current which corresponds to the greatest one of the supply voltages corresponding to the at least one mode inflection point is greater than two-fold of the preset PC current level and smaller than two-fold of the preset CC current level, determining that the first mobile device and the second mobile device are in a charging mode combination (6), wherein in the charging mode combination (6), the first mobile device and the second mobile device are both in the CV charging mode;

step S217: in a case wherein the current versus voltage characteristic curve has the at least one mode inflection point and in a case wherein the corresponding level of the supply current which corresponds to the greatest one of the supply voltages corresponding to the at least one mode inflection point is equal to the sum of the preset CC current level plus the preset PC current level, determining that the first mobile device and the second mobile device are in a charging mode combination (7), wherein in the charging mode combination (7), one of the first mobile device and the second mobile device is in the CC charging mode, whereas, another one of the first mobile device and the second mobile device is in the PC mode;

step S218: in a case wherein the current versus voltage characteristic curve has the at least one mode inflection point and in a case wherein the corresponding level of the supply current which corresponds to the greatest one of the supply voltages corresponding to the at least one mode inflection point is greater than the sum of the preset CC current level plus the preset PC current level and smaller than two-fold of the preset CC current level, determining that the first mobile device and the second mobile device are in a charging mode combination (8), wherein in the charging mode combination (8), one of the first mobile device and the second mobile device is in the CC charging mode, whereas, another one of the first mobile device and the second mobile device is in the CV charging mode; and/or step S219: in a case wherein the current versus voltage characteristic curve has the at least one mode inflection point and in a case wherein the corresponding level of the supply current which corresponds to the greatest one of the supply voltages corresponding to the at least one mode inflection point is equal to two-fold of the preset CC current level, determining that the first mobile device and the second mobile device are in a charging mode combination (9), wherein in the charging mode combination (9), the first mobile device and the second mobile device are both in the CC charging mode.

23. The charging control method of claim 22, wherein in a case wherein the charging control method is configured to operably determine the charging mode combination where the first mobile device and the second mobile device are in according to at least one of the step S212, the step S215, the step S216 or the step S218, each of the step S212, the step S215, the step S216 and the step S218 further includes a corresponding operation as the following:

- the step S212 further including: only when the information indicated by the supply voltage corresponding to the at least one mode inflection point is greater than or equal to the CV voltage threshold, then determining that the first mobile device and the second mobile device the charging are in mode combination (2);
- the step S215 further including: only when the information indicated by the greatest one of the supply voltages corresponding to the mode inflection points is greater than or equal to the CV voltage threshold and when the information indicated by the smallest one of the supply voltages corresponding to the mode inflection points is smaller than the CC voltage then determining that the first mobile device and the second mobile device are in the charging mode combination (5);
- the step S216 further including: only when the information indicated by the supply voltages corresponding to the at least one mode inflection point are all greater than or equal to the CV voltage threshold, then determining that the first mobile device and the second mobile device are in the charging mode combination (6); and/or
- the step S218 further including: only when the information indicated by the greatest one of the supply voltages corresponding to the at least one mode inflection point is greater than the CV voltage threshold and when the information indicated by the one of smallest the supply voltages corresponding to the at least one mode inflection point is smaller than the CV voltage threshold and is greater than or equal to the CC voltage threshold, then determining that the first mobile device and the second mobile device are in the charging mode combination (8).

24. The charging control method of claim 23, wherein in a case wherein the step S21 is present, the charging control method is configured to operably control the supply power further according to the following step:

step S3: according to the charging mode combination where the first mobile device and the second mobile device are in and according to the information indicated by the supply current and/or the supply voltage corresponding to the at least one mode inflection point, adjusting the supply voltage to charge the first battery of the corresponding mobile device, so as to reduce the voltage drop of each mobile charging circuit.

25. The charging control method of claim 24, wherein the step S3 includes the following step:

step S31: in a case wherein the first mobile device and the second mobile device are in the charging mode combination (1), the charging mode combination (2) or the charging mode combination (3), according to the supply voltage corresponding to the one and the only one mode inflection point, determining the level of the supply voltage to charge the first battery of the corresponding mobile device, so as to enhance charging speed and reduce the voltage drop of each mobile charging circuit.

26. The charging control method of claim 24, wherein the step S3 includes one of the following steps:

- step S32: in a case wherein the first mobile device and the second mobile device are in the charging mode combination (4) to (9), in a power-saving power supply mode, according to the smallest one of the supply voltages corresponding to the at least one mode inflection point, determining the level of the supply voltage to charge the first battery of the corresponding mobile device, thus reducing the voltage drop of each mobile charging circuit;
- step S33: in a case wherein the first mobile device and the second mobile device are in the charging mode combination (4) to (9), in a fast-charging power supply mode, according to the greatest one of the supply voltages corresponding to the at least one mode inflection point, determining the level of the supply voltage, so as to charge the first battery of the corresponding mobile device, thus enhancing charging speed and reducing the voltage drop of each mobile charging circuit; or
- step S34: in a case wherein the first mobile device and the second mobile device are in the charging mode combination (4) to (9), in a balance power supply mode, adjusting the level of the supply voltage, so that the adjusted level of the supply voltage lies between the greatest one of the supply voltages corresponding to the at least one mode inflection point and the smallest one of the supply voltages corresponding to the at least one mode inflection point, thus charging the first battery of the corresponding mobile device, thereby balancing charging speed and power loss.

27. The charging control method of claim 24, wherein subsequent to the step S3, the charging control method is configured to operably control the supply power further according to the following step:

step S4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

28. The charging control method of claim 24, wherein subsequent to the step S3, the charging control method is configured to operably control the supply power further according to the following step:

step S5: after a preset charging period has passed, proceeding back to the step S1, and repeating the steps S1-S3 and S5 until the charging to the first batteries is terminated.

29. The charging control method of claim 22, wherein when determining in the charging combination (0), ceasing providing the supply power.

30. The charging control method of claim 19, wherein the step S22 includes one of the following steps:

- step S221: in a power-saving power supply mode, determining the level of the supply voltage according to the smallest one of the supply voltages corresponding to the at least one mode inflection point, so as to charge the first battery of the corresponding mobile device, thus reducing the voltage drop of each mobile charging circuit;
- step S222: in a fast-charging power supply mode, determining the level of the supply voltage according to the greatest one of the supply voltages corresponding to the at least one mode inflection point, so as to charge the first battery of the corresponding mobile device, thus enhancing charging speed and reducing the voltage drop of each mobile charging circuit; or
- step S223: in a balance power supply mode, adjusting the level of the supply voltage, so that the adjusted level of the supply voltage lies between the greatest one of the supply voltages corresponding to the at least one mode inflection point and the smallest one of the supply voltages corresponding to the at least one mode inflection point, thus charging the first battery of the corresponding mobile device, thereby balancing charging speed and power loss.

31. The charging control method of claim 19, wherein subsequent to the step S22, the charging control method is configured to operably control the supply power further according to the following step:
   step S4: in a case when sensing the supply current and determining that the supply current has been decreased by a preset current difference, adjusting the level of the supply voltage up by a preset voltage difference, to continue charging the first battery of the corresponding mobile device, and repeating this step until the charging to the first batteries is terminated.

32. The charging control method of claim 19, wherein subsequent to the step S22, the charging control method is configured to operably control the supply power further according to the following step:
   step S5: after a preset charging period has passed, proceeding back to the step S1.

33. A charging system, comprising:
   a plurality of mobile devices, which include a first mobile device and a second mobile device, wherein each of the plurality of mobile devices includes:
   a mobile charging circuit;
   a first battery, wherein each mobile charging circuit is configured to operably convert a supply power to a charging power for charging the corresponding first battery, wherein the mobile charging circuit is operable in at least two charging modes of a precharging (PC) mode, a constant current (CC) charging mode and a constant voltage (CV) charging mode, so as to charge the corresponding first battery; and
   a charging apparatus, which is coupled to the plurality of mobile devices in a removable way, wherein the charging control apparatus is configured to operably provide the supply power to the first mobile device and the second mobile device, wherein the charging control apparatus includes:
      a switching power converter, which is configured to operably convert an input power to the supply power, wherein the supply power has a supply voltage and a supply current; and
      a conversion control circuit, which is configured to operably control the switching power converter;
      wherein the conversion control circuit is configured to operably control the switching power converter according to the following steps:
   step S1: controlling the switching power converter to gradually adjust a level of the supply voltage within a preset voltage range and sense a level of the corresponding supply current through, or, to gradually adjust the level of the supply current within a preset current range and sense the level of the corresponding supply voltage, thereby establishing a current versus voltage characteristic curve corresponding to the supply power; and
   step S2: performing one of the following step S21 or S22 according to whether the current versus voltage characteristic curve has at least one mode inflection point and according to information indicated by the supply current and/or the supply voltage corresponding to the at least one mode inflection point in a situation where the at least one mode inflection point is present:
      step S21: determining a charging mode combination where the first mobile device and the second mobile device are in; or
      step S22: in the situation where the at least one mode inflection point is present, adjusting the supply voltage according to the information indicated by the supply current and/or the supply voltage corresponding to the at least one mode inflection point, so as to charge the first battery of the corresponding mobile device according to the supply voltage, such that a voltage drop of each mobile charging circuit is reduced.

34. The charging system of claim 33, wherein the step S21 includes: in the situation where the at least one mode inflection point is present, comparing the information indicated by the supply current corresponding to the at least one mode inflection point with a preset precharging (PC) current level and a preset constant current (CC) current level, so as to determine the charging mode combination where the first mobile device and the second mobile device are in.

35. The charging system of claim 33, wherein the step S21 includes:
   comparing the information indicated by the supply voltage corresponding to the at least one mode inflection point of the current versus voltage characteristic curve with a constant voltage (CV) voltage threshold and a CC voltage threshold, so as to determine the charging mode combination where the first mobile device and the second mobile device are in.

36. The charging system of claim 33, wherein in a case wherein the step S21 is present, the conversion control circuit is configured to operably control the switching power converter further according to the following step:
   step S3: according to the charging mode combination where the first mobile device and the second mobile device are in and according to the information indicated by the supply current and/or the supply voltage corresponding to the at least one mode inflection point, adjusting the supply voltage to charge the first battery of the corresponding mobile device, so as to reduce the voltage drop of each mobile charging circuit.

* * * * *